United States Patent
Nozaki et al.

(10) Patent No.: US 9,670,569 B2
(45) Date of Patent: *Jun. 6, 2017

(54) COLD-ROLLED STEEL SHEET AND PRODUCTION METHOD THEREOF

(75) Inventors: Takayuki Nozaki, Tokyo (JP); Manabu Takahashi, Tokyo (JP); Nobuhiro Fujita, Tokyo (JP); Hiroshi Yoshida, Tokyo (JP); Shinichiro Watanabe, Tokyo (JP); Takeshi Yamamoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 939 days.

This patent is subject to a terminal disclaimer.

(21) Appl. No.: 14/004,562

(22) PCT Filed: Mar. 28, 2012

(86) PCT No.: PCT/JP2012/058199
§ 371 (c)(1),
(2), (4) Date: Sep. 11, 2013

(87) PCT Pub. No.: WO2012/133563
PCT Pub. Date: Oct. 4, 2012

(65) Prior Publication Data
US 2014/0000765 A1    Jan. 2, 2014

(30) Foreign Application Priority Data

Mar. 28, 2011  (JP) ................................. 2011-070725

(51) Int. Cl.
*C21D 8/02* (2006.01)
*C22C 38/00* (2006.01)
(Continued)

(52) U.S. Cl.
CPC ............ *C22C 38/26* (2013.01); *B32B 15/013* (2013.01); *C21D 8/0226* (2013.01);
(Continued)

(58) Field of Classification Search
CPC combination set(s) only.
See application file for complete search history.

(56) References Cited

U.S. PATENT DOCUMENTS

2003/0196735 A1    10/2003   Sugiura et al.
2004/0244877 A1    12/2004   Yokoi et al.
(Continued)

FOREIGN PATENT DOCUMENTS

CN        1599802        3/2005
CN     103476960 A       12/2013
(Continued)

OTHER PUBLICATIONS

Notice of Allowance dated Apr. 1, 2014 issued in Japanese Application No. 2011-035776 [with English Translation].
(Continued)

*Primary Examiner* — Jessee Roe
*Assistant Examiner* — Jeremy Jones
(74) *Attorney, Agent, or Firm* — Birch, Stewart, Kolasch & Birch, LLP

(57) ABSTRACT

This is a cold-rolled steel sheet includes, by mass %, C: 0.02% to 0.4%, Si: 0.001% to 2.5%, Mn: 0.001% to 4.0%, and Al: 0.001% to 2.0%. The sum of the Si content and the Al content is 1.0% to 4.5%. An average pole density of an orientation group from {100}<011> to {223}<110> is 1.0 to 6.5, and a pole density of a crystal orientation {332}<113> is 1.0 to 5.0. A microstructure includes, by an area ratio %, 5% to 80% of ferrite, 5% to 80% of bainite, and 2% to 30% of retained austenite. In the microstructure, by an area ratio %, martensite is limited to 20% or less, pearlite is limited to 10% or less, and tempered martensite is limited to 60% or less.

19 Claims, 6 Drawing Sheets

(51) Int. Cl.
C22C 38/02 (2006.01)
C22C 38/04 (2006.01)
C22C 38/06 (2006.01)
C22C 38/08 (2006.01)
C22C 38/12 (2006.01)
C22C 38/14 (2006.01)
C22C 38/18 (2006.01)
C22C 38/16 (2006.01)
C22C 38/20 (2006.01)
C22C 38/38 (2006.01)
C22C 38/26 (2006.01)
C22C 38/10 (2006.01)
C22C 38/28 (2006.01)
C22C 38/34 (2006.01)
C21D 9/46 (2006.01)
B32B 15/01 (2006.01)
C22C 38/60 (2006.01)
C23C 2/02 (2006.01)
C23C 2/06 (2006.01)
C23C 2/28 (2006.01)
C23C 2/40 (2006.01)
C21D 8/04 (2006.01)

(52) U.S. Cl.
CPC ......... *C21D 8/0263* (2013.01); *C21D 8/0463* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/28* (2013.01); *C22C 38/34* (2013.01); *C22C 38/38* (2013.01); *C22C 38/60* (2013.01); *C23C 2/02* (2013.01); *C23C 2/06* (2013.01); *C23C 2/28* (2013.01); *C23C 2/40* (2013.01); *C21D 2201/05* (2013.01); *C21D 2211/002* (2013.01); *C21D 2211/005* (2013.01); *C21D 2211/009* (2013.01)

(56) References Cited

U.S. PATENT DOCUMENTS

| 2008/0202639 | A1 | 8/2008 | Tomida et al. | |
| 2009/0223609 | A1* | 9/2009 | Hakomori | C21D 6/002 148/602 |
| 2011/0036465 | A1* | 2/2011 | Kawasaki | C21D 8/0205 148/533 |
| 2014/0000765 | A1 | 1/2014 | Nozaki et al. | |

FOREIGN PATENT DOCUMENTS

| EP | 1201780 | 5/2002 |
| EP | 1327695 | 7/2003 |
| EP | 1362930 | 11/2003 |
| EP | 2 088 218 A1 | 8/2009 |
| EP | 2264206 | 12/2010 |
| JP | 61-217529 | 9/1986 |
| JP | 05-059429 | 3/1993 |
| JP | 2000-119804 A | 4/2000 |
| JP | 2000-144314 A | 5/2000 |
| JP | 2001-089811 | 4/2001 |
| JP | 2002-115025 | 4/2002 |
| JP | 2009-097545 | 4/2002 |
| JP | 2003-113440 | 4/2003 |
| JP | 2003-160836 A | 6/2003 |
| JP | 2003-293083 | 10/2003 |
| JP | 2004-035905 | 2/2004 |
| JP | 2004-250743 | 9/2004 |
| JP | 2004-250744 | 9/2004 |
| JP | 2005-256020 A | 9/2005 |
| JP | 2005-314798 | 11/2005 |
| JP | 2006-22349 A | 1/2006 |
| JP | 2007-162078 | 6/2007 |
| JP | 2007-291514 A | 11/2007 |
| JP | 2008-274395 | 11/2008 |
| JP | 2009-13478 A | 1/2009 |
| JP | 2009-030159 | 2/2009 |
| JP | 2009030159 A * | 2/2009 |
| JP | 2009-114523 | 5/2009 |
| JP | 2009-132981 | 6/2009 |
| JP | 2009-263718 A | 11/2009 |
| JP | 2010-53387 A | 3/2010 |
| JP | 2010-059452 | 3/2010 |
| JP | 2010-90476 A | 4/2010 |
| KR | 10-0754035 | 9/2007 |
| RU | 2312163 C2 | 12/2007 |
| RU | 2403291 C2 | 11/2010 |
| TW | 200938640 | 9/2009 |
| TW | 201114921 A | 5/2011 |
| WO | WO 2011/148490 A1 | 12/2011 |
| WO | WO 2012/014926 A1 | 2/2012 |

OTHER PUBLICATIONS

Notice of Allowance dated Apr. 14, 2015 issued in corresponding Korean Application No. 10-2013-7024766 [with English Translation].
Office Action of Jan. 14, 2014 issued in corresponding Taiwanese Application No. TW 101110980 [with English Translation].
International Search Report of Jun. 26, 2012 issued in corresponding PCT Application No. PCT/JP2012/058160.
International Search Report of Jun. 26, 2012 issued in PCT Application No. PCT/JP2012/058160 corresponding to related U.S. Appl. No. 14/007,583 [with English Translation].
Search Report dated Nov. 5, 2014 issued in corresponding European Application No. 12763971.4.
Search Report dated Nov. 7, 2014 issued in corresponding European Application No. 12762991.3.
International Search Report dated Jun. 26, 2012 issued in corresponding PCT Application No. PCT/JP2012/058199.
Takahashi et al., High Strength Hot-rolled Steel Sheets for Automobiles, Nippon Steel Corporation Technical Report, 2003, No. 378, p. 7-11. [With English Abstract].
Katoh et al., Development of High Strength Steels for Automobiles, Steel-manufacturing studies (scitctu kenkyu), vol. 312, p. 41-50, 1984. [With English Abstract].
Sugimoto et al., Stretch-flangeability of a High-strength TRIP Bainitic Sheet Steel, ISIJ International, vol. 40, 2000, No. 9, pp. 920-926.
NFG Catalog, Nakayama Steel Works, Ltd. https://www.nakayama-steel.co.jp/menu/product/nfg.html. [With English Translation].
Chinese Office Action, dated Jan. 16, 2015, for Chinese Application No. 201280024780.2, with an English translation.
International Search Report, dated Aug. 21, 2012, for International Application No. PCT/JP2012/063261, with an English translation.
Japanese Office Action, dated Aug. 27, 2013, for Japanese Application No. 2011-032465, with an English translation.
Matsumura et al., "Enhancement of Elongation by Retained Austenite in Intercritical Annealed 0.4C-1.5Si-0.8 Steel", Transactions ISIJ, vol. 27, 1987, pp. 570-579.
Russian Office Action, dated Jan. 19, 2015, for Russian Application No. 2013151804, with an English translation.
International Search Report and English translation thereof issued in PCT/JP2011/067070, dated Oct. 18, 2011.
JIS Z 2241, "Metallic Materials—Tensile Testing—Method of Test at Room Temperature," 2011, pp. 477-548.
JIS Z 2248, "Metallic Materials—Bend Test," 2006, pp. 733-748.
Kishida, "High Strength Steel Sheets for Light Weight Vehicle," Nippon Steel Corporation Technical Report, 1999, pp. 13-17, No. 371, with an English abstract.

* cited by examiner

COLD-ROLLED STEEL SHEET AND PRODUCTION METHOD THEREOF

This application is a national stage application of International Application No. PCT/JP2012/058199, filed Mar. 28, 2012, which claims priority to Japanese Application No. 2011-070725, filed Mar. 28, 2011, the content of which is incorporated by reference in its entirety.

TECHNICAL FIELD

The present invention relates to a high-strength cold-rolled steel sheet that is excellent in ductility and hole expansibility, and a production method thereof. Particularly, the present invention relates to a steel sheet using a TRIP (Transformation Induced Plasticity) phenomenon.

Priority is claimed on Japanese Patent Application No. 2011-70725, filed on Mar. 28, 2011, the content of which is incorporated herein by reference.

BACKGROUND ART

High strengthening of a steel sheet that is a raw material has been in progress so as to realize compatibility between a weight saving of a body, components, and the like of a vehicle, and safety. Generally, when the strength of the steel sheet increases, ductility decreases, and thus formability is damaged. Therefore, the balance of strength and ductility is necessary in order to use the high-strength steel sheet for the members of the vehicles. For this requirement, hitherto, a so-called TRIP steel sheet, in which transformation induced plasticity of retained austenite is used, has been suggested (for example, refer to Patent Document 1 and Patent Document 2).

However, the TRIP steel has characteristics in which strength and ductility are excellent, but generally, local deformability such as hole expansibility is low. Furthermore, so as to progress the weight saving of the vehicle body, it is necessary to increase a use strength level of the high-strength steel sheet beyond that of the related art. Therefore, for example, so as to use the high-strength steel sheet for underbody components, it is necessary to improve local deformability such as hole expansibility.

CITATION LIST

Patent Literature

[Patent Document 1] Japanese Unexamined Patent Application, First Publication No. S61-217529
[Patent Document 2] Japanese Unexamined Patent Application, First Publication No. H5-59429

SUMMARY OF INVENTION

Problem to be Solved by the Invention

Therefore, the present invention is an object to provide a high-strength cold-rolled steel sheet, in which ductility and hole expansibility are further improved in the TRIP steel, and a production method thereof.

Means for Solving the Problems

The present inventors have found that in the TRIP steel, a cold-rolled steel sheet, in which a pole density of a predetermined crystal orientation is controlled, has excellent strength, ductility, hole expansibility, and balance therebetween. In addition, the present inventors have succeeded in producing a steel sheet which is excellent in strength, ductility, and hole expansibility by optimizing chemical components and production conditions of the TRIP steel so as to control a microstructure of the steel sheet. The essence of the present invention is as follows.

(1) According to an aspect of the present invention, there is provided a cold-rolled steel sheet having a chemical composition including, by mass %, of C: 0.02% to 0.4%, Si: 0.001% to 2.5%, Mn: 0.001% to 4.0%, Al: 0.001% to 2.0%, and P: limited to 0.15% or less, S: limited to 0.03% or less, N: limited to 0.01% or less, O: limited to 0.01% or less, and the balance consisting of Fe and unavoidable impurities. In the steel sheet chemical composition, a sum of the Si content and the Al content is 1.0% to 4.5%. In a sheet thickness central portion within a range of $5/8$ to $3/8$ of a sheet thickness, an average pole density of an orientation group from {100}<011> to {223}<110>, which is a pole density expressed by an arithmetic average of pole densities of respective crystal orientations {100}<011>, {116}<110>, {114}<110>, {112}<110>, and {223}<110>, is 1.0 to 6.5, and a pole density of a crystal orientation {332}<113> is 1.0 to 5.0. A plurality of grains is in a microstructure of the steel sheet. The microstructure of the steel includes, by an area ratio, 5% to 80% of ferrite, 5% to 80% of bainite, and 2% to 30% of retained austenite, and in the microstructure, martensite is limited to 20% or less, pearlite is limited to 10% or less, and tempered martensite is limited to 60% or less. rC that is a Lankford value in a direction orthogonal to a rolling direction is 0.70 to 1.10, and r30 that is a Lankford value in a direction forming an angle of 30° with the rolling direction is 0.70 to 1.10.

(2) In the cold-rolled steel sheet according to (1), the steel sheet chemical composition may further include, by mass %, one or more selected from the group consisting of Ti: 0.001% to 0.2%, Nb: 0.005% to 0.2%, B: 0.0001% to 0.005%, Mg: 0.0001% to 0.01%, REM: 0.0001% to 0.1%, Ca: 0.0001% to 0.01%, Mo: 0.001% to 1.0%, Cr: 0.001% to 2.0%, V: 0.001% to 1.0%, W: 0.001% to 1.0%, Ni: 0.001% to 2.0%, Cu: 0.001% to 2.0%, Co: 0.0001% to 1.0%, Sn: 0.0001% to 0.2%, Zr: 0.0001% to 0.2%, and As: 0.0001% to 0.5%.

(3) In the cold-rolled steel sheet according to (1) or (2), a volume average diameter of the grains may be 2 μm to 15 μm.

(4) In the cold-rolled steel sheet according to any one of (1) to (3), the average pole density of the orientation group from {100}<011> to {223}<110> may be 1.0 to 5.0, and the pole density of the crystal orientation {332}<113> may be 1.0 to 4.0.

(5) In the cold-rolled steel sheet according to any one of (1) to (4), among the plurality of grains, an area ratio of grains which exceeds 35 μm may be limited to 10% or less.

(6) In the cold-rolled steel sheet according to any one of (1) to (5), among the plurality of grains, a proportion of grains, in which a value obtained by dividing a length of a grain in the rolling direction by a length of a grain in a sheet thickness direction is 3.0 or less, may be 50% to 100%.

(7) In the cold-rolled steel sheet according to any one of (1) to (6), a Vickers hardness of the bainite may be 180 HV or more, and an average concentration of C in the residual austenite may be 0.9% or more.

(8) In the cold-rolled steel sheet according to any one of (1) to (7), rL that is a Lankford value in the rolling direction may be 0.70 to 1.10, and r60 that is a Lankford value in a direction forming an angle of 60° with the rolling direction may be 0.70 to 1.10.

(9) In the cold-rolled steel sheet according to any one of (1) to (8), a hot-dip galvanized layer or a galvannealed layer may be provided on a surface of the steel sheet.

(10) According to another aspect of the present invention, there is provided a production method of a cold-rolled steel sheet. The method includes: a first hot-rolling process of performing a hot-rolling with respect to steel, so as to set an average austenite grain size of the steel to 200 μm or less, under the condition such that, a pass is performed, with a rolling reduction ratio of 40% or more at least one time, in a temperature range of 1,000° C. to 1,200° C., and the steel chemical composition includes, by mass %, C: 0.02% to 0.4%, Si: 0.001% to 2.5%, Mn: 0.001% to 4.0%, Al: 0.001% to 2.0%, and P: limited to 0.15% or less, S: limited to 0.03% or less, N: limited to 0.01% or less, O: 0.01% or less, and the balance consisting Fe and unavoidable impurities, and in which a sum of the Si content and the Al content may be 1.0% to 4.5%; a second hot-rolling process of performing a hot-rolling with respect to the steel, under the condition such that, a large-rolling-reduction pass with a rolling reduction ratio of 30% or more in a temperature range of T1+30° C. to T1+200° C. when a temperature calculated by the following Expression 1 is set to T1° C., an accumulative rolling reduction ratio in the temperature range of T1+30° C. to T1+200° C. is 50% or more, an accumulative rolling reduction ratio in a temperature range, that is higher than or equal to $Ar_3°$ C. and lower than T1+30° C., is limited to 30% or less when $Ar_3°$ C. is calculated by the following Expression 4, and a rolling termination temperature is higher than or equal to the $Ar_3°$ C., which is calculated by the following Expression 4; a first cooling process of performing a cooling with respect to the steel, in such a manner that a standby time t second, which is set as a time from a completion of a final pass among the large-rolling-reduction passes to a cooling initiation, satisfies the following Expression 2; a coiling process of performing a coiling with respect to the steel in a temperature range of 650° C. or lower; a pickling process of pickling with respect to the steel; a cold-rolling process of performing a cold-rolling with respect to the steel at a rolling reduction ratio of 30% to 90%; a two-step heating process of performing two-step heating with respect to the steel, in which an average heating rate HR1 in a temperature range from room temperature to 650° C. is 0.3° C./s or more, and an average heating rate HR2 in a temperature range from higher than 650° C. to $Ac_1°$ C., when $Ac_1°$ C. is calculated by the following Expression 5, is 0.5×HR1 or less, unit is ° C./s; a retaining process of performing a retaining with respect to the steel within a temperature range of $Ac_1°$ C. to 900° C. for 1 second to 300 seconds; a cooling process of performing a cooling with respect to the steel until a temperature range of 580° C. to 780° C., at an average cooling rate from 1° C./s to 20° C./s; a cooling process of performing a cooling with respect to the steel to a temperature $T_{OA}$, which is within a temperature range of 350° C. to 500° C., at an average cooling rate of 5° C./s to 200° C./s; and a retaining process of performing a retaining with respect to the steel so as to obtain a steel sheet, the steel is retained within the temperature range of 350° C. to 500° C. for a time of $t_{OA}$ seconds or more, which is calculated by the following Expression 6, to 1,000 seconds or less, or the steel sheet is further cooled to a temperature of 350° C. or lower, then the steel is reheated to the temperature range of 350° C. to 500° C., and the steel is retained within the temperature range of 350° C. to 500° C. for the time of $t_{OA}$ seconds or more, which is calculated by the following Expression 6, to 1,000 seconds or less, $T1=850+10×([C]+[N])×[Mn]$ (Expression 1)

here, [C], [N], and [Mn] represent mass percentages of the C content, the N content, and the Mn content in the steel, respectively, $t≤2.5×t1$ (Expression 2)

here, t1 is expressed by the following Expression 3, $t1=0.001×((Tf-T1)×P1/100)^2-0.109×((Tf-T1)×P1/100)+3.1$ (Expression 3)

here, Tf represents a Celsius temperature of the steel at the time of completion of the final pass, and P1 represents a percentage of the rolling reduction ratio during the final pass, $Ar_3=879.4-516.1×[c]-65.7×[Mn]+38.0×[Si]+274.7×[P]$ (Expression 4)

$Ac_1=723-10.7×[Mn]-16.9×[Ni]+29.1×[Si]+16.9×[Cr]+290×[As]+6.38×[W]$ (Expression 5)

[Mathematical Expression 1]

$$t_{OA} = 10^{0.0002(T_{OA}-425)^2+1.18}$$ (Expression 6)

(11) In the production method of a cold-rolled steel sheet according to (10), the production method may have, in which the steel chemical composition may further includes, by mass %, one or more selected from the group consisting of Ti: 0.001% to 0.2%, Nb: 0.005% to 0.2%, B: 0.0001% to 0.005%, Mg: 0.0001% to 0.01%, REM: 0.0001% to 0.1%, Ca: 0.0001% to 0.01%, Mo: 0.001% to 1.0%, Cr: 0.001% to 2.0%, V: 0.001% to 1.0%, W: 0.001% to 1.0%, Ni: 0.001% to 2.0%, Cu: 0.001% to 2.0%, Co: 0.0001% to 1.0%, Sn: 0.0001% to 0.2%, Zr: 0.0001% to 0.2%, and As: 0.0001% to 0.5%, and a temperature calculated by the following Expression 7 in place of the temperature calculated by Expression 1 may be set as T1° C.

$T1=850+10×([C]+[N])×[Mn]+350×[Nb]+250×[Ti]+40×[B]+10×[Cr]+100×[Mo]+100×[V]$ (Expression 7)

here, [C], [N], [Mn], [Nb], [Ti], [B], [Cr], [Mo], and [V] represent mass percentages of C, N, Mn, Nb, Ti, B, Cr, Mo, and V in the steel, respectively,

(12) In the production method of a cold-rolled steel sheet according to (10) or (11), the standby time t second may satisfy the following Expression 8 using t1.

$0≤t<t1$ (Expression 8)

(13) In the production method of a cold-rolled steel sheet according to (10) or (11), the standby time t second may satisfy the following Expression 9 using t1.

$t1≤t≤2.5×t1$ (Expression 9)

(14) In the production method of a cold-rolled steel sheet according to any one of (10) to (13), in the first cooling, a cooling temperature variation that is a difference between a steel temperature at the time of the cooling initiation and a steel temperature at the time of the cooling termination may be 40° C. to 140° C., and the steel temperature at the time of the cooling termination may be T1+100° C. or lower.

(15) In the production method of a cold-rolled steel sheet according to any one of (10) to (14), the first hot-rolling may include a pass having a rolling reduction ratio of 40% or more at least one or more times, and an average austenite grain size of the steel may be to 100 μm or less.

(16) In the production method of a cold-rolled steel sheet according to any one of (10) to (15), the second cooling may be initiated within 10 seconds after passing through a final rolling stand and after terminating the first cooling.

(17) In the production method of a cold-rolled steel sheet according to any one of (10) to (16), in the second hot-rolling, a temperature rising of the steel between respective passes in the temperature range from T1+30° C. to T1+200° C. may be set to 18° C. or lower.

(18) In the production method of a cold-rolled steel sheet according to any one of (10) to (17), the first cooling may be performed at between rolling stands.

(19) In the production method of a cold-rolled steel sheet according to any one of (10) to (18), a hot-dip galvanized layer or a galvannealed layer may be formed on a surface of the steel sheet.

Advantage of the Invention

According to the aspects of the present invention, it is possible to provide a high-strength steel sheet which is excellent in ductility and hole expansibility, and a production method. When the steel sheet is used, particularly, weight saving of vehicles and collision safety of vehicles may be compatible with each other, and thus an industrial contribution is very significant.

DESCRIPTION OF EMBODIMENTS

In the TRIP steel sheet which is one of technologies to increase ductility, during an annealing process, since C in austenite is concentrated, and thus an amount of retained austenite or the content of C in the retained austenite increases. Accordingly, tensile strength is improved.

The present inventors have found that in the TRIP steel sheet, by optimizing steel components or a microstructure during production, by starting a cooling which is initiated from a temperature range of a two-phase region of ferrite and austenite or a single phase region of austenite, by controlling a cooling (two-step cooling) in a predetermined temperature range, and by retaining the steel sheet in this temperature range, a steel sheet in which the balance between strength, ductility, and hole expansibility is excellent may be obtained.

Hereinafter, a cold-rolled steel sheet related to an embodiment of the present invention will be described in detail.

First, a pole density of a crystal orientation of the cold-rolled steel sheet will be described.

Pole Density (D1 and D2) of Crystal Orientation:

In the cold-rolled steel sheet related to the embodiment, as pole densities of two kinds of crystal orientations, with respect to a sheet-thickness cross-section, which is parallel with a rolling direction, at a sheet-thickness central portion within a range of 5/8 to 3/8 of sheet thickness (that is a range distant from a surface of the steel sheet by a distance of 5/8 to 3/8 sheet thickness in a sheet thickness direction (depth direction) of the steel sheet), an average pole density D1 of an orientation group from {100}<011> to {223}<110> (hereinafter, may be abbreviated as an average pole density), and a pole density D2 of a crystal orientation {332}<113> are controlled.

In the embodiment, the average pole density is a characteristic (an orientation integration degree, a development degree of a texture) of a particularly important texture (a crystal orientation of a grain in a microstructure). In addition, the average pole density is a pole density expressed by an arithmetic average of pole densities of respective crystal orientations {100}<011>, {116}<110>, {114}<110>, {112}<110>, and {223}<110>.

Figure 1:
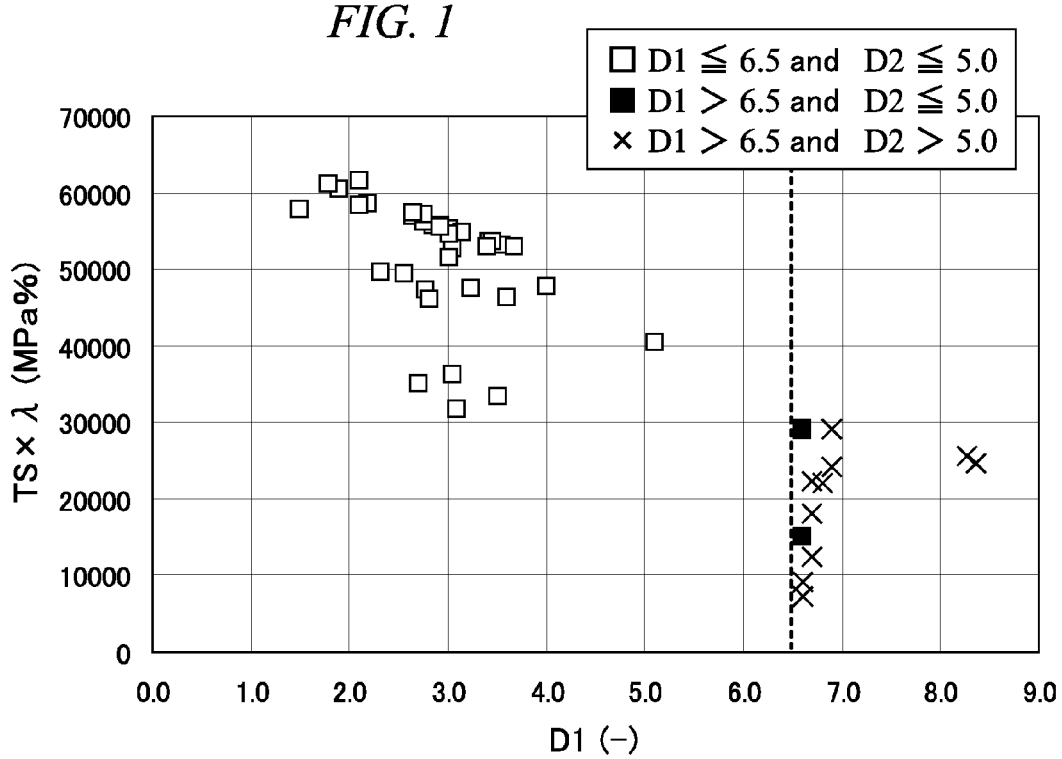
FIG. 1 is a diagram illustrating a relationship between an average pole density D1 of an orientation group from {100}<011> to {223}<110> and tensile strength TS×hole expanding ratio λ.
Figure 2:
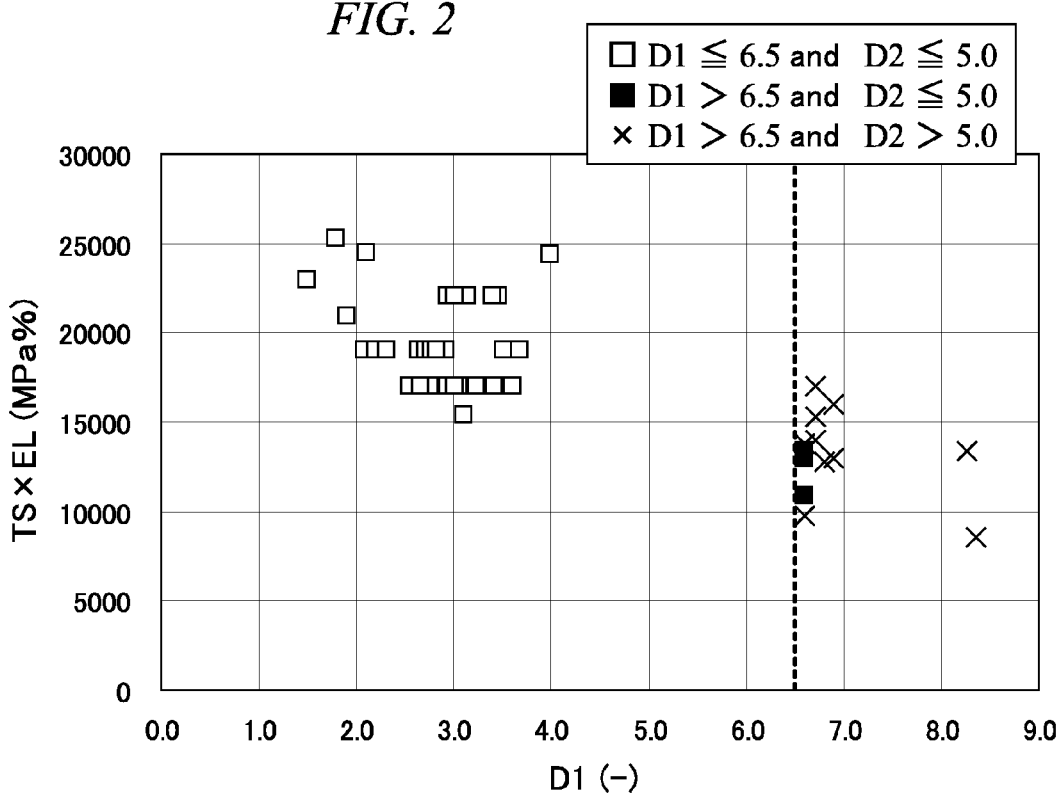
FIG. 2 is a diagram illustrating a relationship between an average pole density D1 of an orientation group from {100}<011> to {223}<110> and tensile strength TS×elongation EL.

In FIGS. 1 and 2, with respect to a cross-section at a sheet-thickness central portion within a range of 5/8 to 3/8 of a sheet thickness, X-ray diffraction is performed to obtain intensity ratios of X-ray diffraction intensities of respective orientations for a random sample, and the average pole density of an orientation group from {100}<011> to {223}<110> may be obtained from the respective intensity ratios.

As shown in FIGS. 1 and 2, when the average pole density of the orientation group from {100}<011> to {223}<110> is 6.5 or less, a steel sheet may satisfy properties (indexes TS×λ and TS×EL to be described later) that have become recently required for processing of underbody components. That is, as the properties, tensile strength TS, hole expanding ratio λ, and elongation EL may satisfy TS×λ≥30,000 (refer to FIG. 1), and TS×EL≥14,000 (refer to FIG. 2). In a case of further increasing the indexes TS×λ and TS×EL, it is preferable that the average pole density is 4.0 or less, more preferably 3.5 or less, and still more preferably 3.0 or less.

In addition, when the average pole density exceeds 6.5, anisotropy in mechanical properties of a steel sheet significantly increases. As a result, hole expansibility in a specific direction is improved, but hole expansibility in other directions different from the specific direction significantly deteriorates. Therefore, in this case, with regard to the properties which are necessary for processing of the underbody components, the steel sheet does not satisfy TS×λ≥30,000 and TS×EL≥14,000.

On the other hand, when the average pole density is less than 1.0, there is a concern that hole expansibility deteriorates. Therefore, it is preferable that the average pole density is 1.0 or more.

Figure 3:
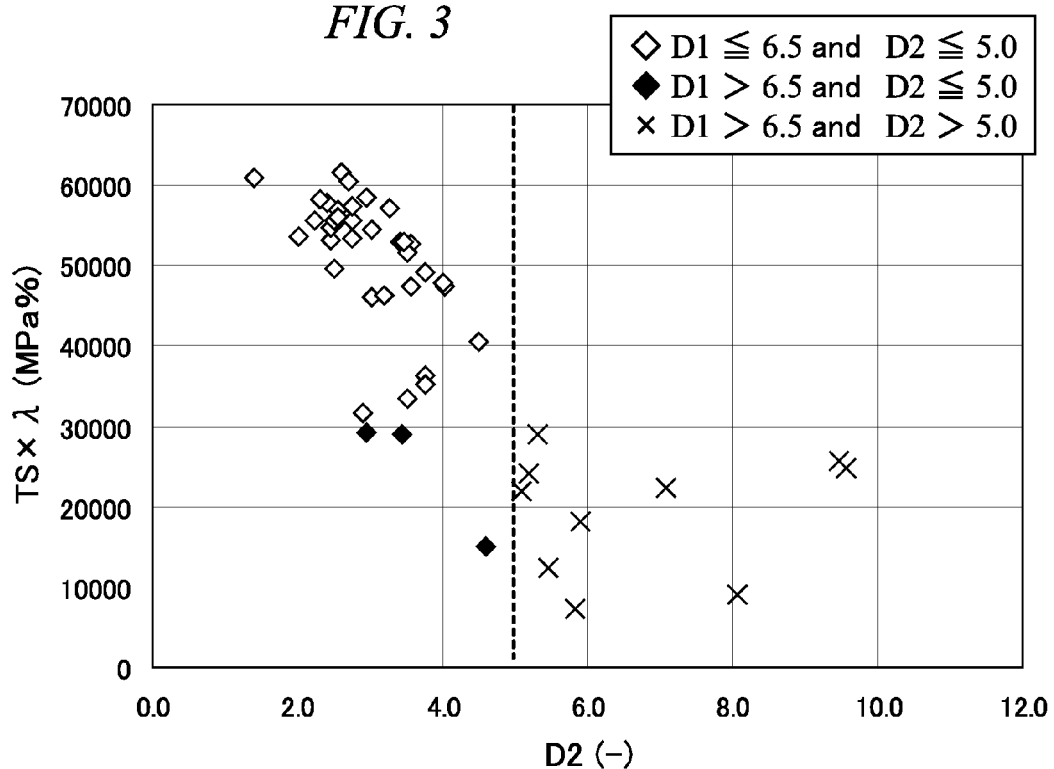
FIG. 3 is a diagram illustrating a relationship between a pole density D2 of an orientation {332}<113> and tensile strength TS×hole expanding ratio λ.
Figure 4:
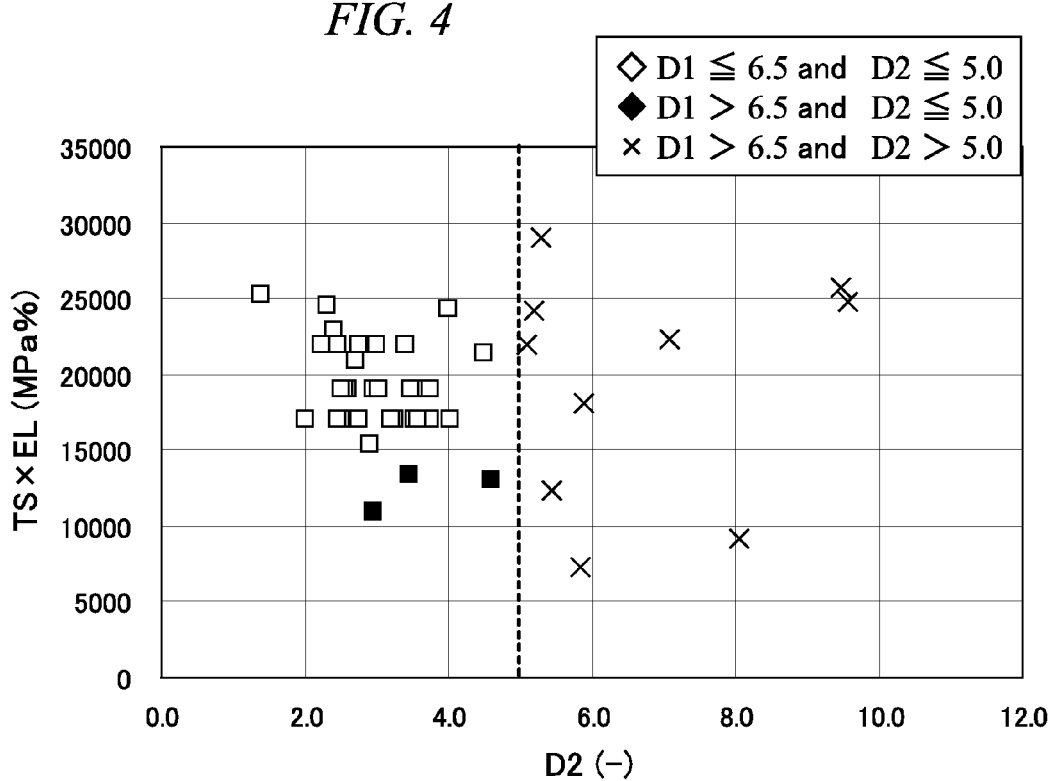
FIG. 4 is a diagram illustrating a relationship between a pole density D2 of an orientation {332}<113> and tensile strength TS×elongation EL.

Furthermore, from the same reason, the pole density of the crystal orientation {332}<113> at the sheet-thickness central portion within a range of 5/8 to 3/8 of the sheet thickness is set to 5.0 or less. Similarly to FIGS. 1 and 2, FIGS. 3 and 4 show a relationship between the pole density of the crystal orientation {332}<113> which is obtained by X-ray diffraction and the respective indexes (TS×λ and TS×EL). As shown in FIGS. 3 and 4, the pole density may be set to 5.0 or less so as to sufficiently secure the respective indexes. That is, when the pole density of the crystal orientation {332}<113> is 5.0 or less, with regard to properties that have become recently required for processing of underbody components, the steel sheet may satisfy TS×λ≥30,000 and TS×EL≥14,000. In a case of further increasing the indexes TS×λ and TS×EL, it is preferable that the pole density is 4.0 or less, and more preferably 3.0 or less. In addition, when the pole density of the crystal orientation {332}<113> exceeds 5.0, anisotropy in mechanical properties of a steel sheet significantly increases. As a result, hole expansibility in a specific direction is improved, but hole expansibility in other directions different from the specific direction significantly deteriorates. Therefore, in this case, with regard to the properties which are necessary for processing of the underbody components, the steel sheet does not satisfy TS×λ≥30,000 and TS×EL≥14,000.

On the other hand, when the pole density of the crystal orientation {332}<113> is less than 1.0, there is a concern that hole expansibility deteriorates. Therefore, it is preferable that the pole density of the crystal orientation {332}<113> is 1.0 or more.

The reason why the above-described pole density of the crystal orientation is important for shape-retaining properties during elongation and hole expanding process is not necessarily clear, but it is assumed that the reason has a relationship with the glide movement of a crystal during a hole expanding process.

The pole density has the same meaning as an X-ray random intensity ratio. The X-ray random intensity ratio is a numerical value obtained by dividing diffraction intensity of a sample material by diffraction intensity of a standard sample not having integration in a specific orientation. The diffraction intensity (X-ray or electron) of the standard sample, and the diffraction intensity of the sample material may be obtained by measurement using an X-ray diffraction method and the like under the same conditions. The pole density may is capable of being measured using X-ray diffraction, EBSD (Electron Back Scattering Diffraction), or electron channeling. For example, the pole density of the orientation group from {100}<011> to {223}<110> may be obtained as follows. The pole densities of respective crystal orientations {100}<011>, {116}<110>, {114}<110>, {112}<110>, and {223}<110> are obtained from a three-dimensional texture (ODF) calculated by a series expanding method using a plurality of pole figures among the pole figures {110}, {100}, {211}, and {310} measured by the methods, and these pole densities are arithmetically averaged to obtain the pole density of the orientation group from {100}<011> to {223}<110>.

With respect to the sample that is provided for the X-ray diffraction, the EBSD, and the electron channeling, the thickness of the steel sheet may be reduced by mechanical polishing or the like to a predetermined sheet thickness, subsequently, at the same time to may remove a strain by chemical polishing, electrolytic polishing, or the like, the sample may be adjusted in order for an appropriate surface including a range of 5/8 to 3/8 of the sheet thickness to be a measurement surface, and the pole density may be measured according to the above-described methods. With regard to a sheet width direction, it is preferable that the sample is collected in the vicinity at 1/4 or 3/4 of a sheet thickness position (a position distant from an end surface of the steel sheet by a distance that is 1/4 of a sheet width of the steel sheet).

With regard to not only the sheet thickness central portion but also as many sheet thickness positions as possible, when the steel sheet satisfies the above-described pole density, hole expansibility is further improved.

However, the orientation integration of the above-described sheet thickness central portion has the most influence for the anisotropy of the steel sheet, and thus the material quality of the sheet thickness central portion is generally represent material properties of the entirety of the steel sheet. Accordingly, the average pole density of the orientation group from {100}<011> to {223}<110> and the pole density of the crystal orientation {332}<113> in the range of 5/8 to 3/8 of the sheet thickness central portion are specified.

Here, {hkl}<uvw> represents that when the sample is collected by the above-described method, a normal direction of a sheet surface is parallel with <hkl>, and a rolling direction is parallel with <uvw>. In addition, with regard to a crystal orientation, an orientation that is orthogonal to the sheet surface is commonly expressed by (hkl) or {hkl}, and an orientation that is parallel with the rolling direction is expressed by [uvw] or <uvw>. {hkl}<uvw> collectively represents equivalent planes, and (hkl)[uvw] represents individual crystal planes. That is, in the embodiment, since a body centered cubic structure (bcc structure) is a target, for example, respective planes (111), (−111), (1−11), (11−1), (−1−11), (−11−1), (1−1−1), and (−1−1−1) are equivalent, and thus are not distinguishable. In this case, these orientations are collectively called a plane {111}. The ODF expression is also used for orientation expression of other crystal structures having a low symmetric property, and thus in the ODF expression, an individual orientation is generally expressed by (hkl)[uvw]. However, in the embodiment, {hkl}<uvw> and (hkl)[uvw] have the same meaning.

Next, an r value (Lankford value) of the steel sheet will be described. In this embodiment, so as to further improve local deformability, r values in respective directions (rL that is an r value in a rolling direction to be described later, r30 that is an r value in a direction forming an angle of 30° with the rolling direction, r60 that is an r value in a direction forming an angle of 60° with the rolling direction, and rC that is an r value in a direction orthogonal to the rolling direction) may be set within a predetermined range. These r values are important in the embodiment. As a result of the intensive investigation by the present inventors, it has been proved that when the above-described respective pole densities are appropriately controlled, and these r values are appropriately controlled, further excellent hole expansibility may be obtained.

r Value (rC) in Direction Orthogonal to Rolling Direction:

That is, as a result of the intensive investigation by the present inventors, they have found that when the respective pole densities, which are described above, are set within the above described range, at that time, and rC is set to 0.70 or more, good hole expansibility may be obtained. Accordingly, rC is set to 0.70 or more.

The upper limit of rC may be 1.10 or less to obtain further excellent hole expansibility.

r Value (r30) in Direction Forming Angle of 30° with Rolling Direction:

As a result of the intensive investigation by the present inventors, they have found that when the respective pole densities, which are described above, are set within the above described ranges, and r30 is set to 1.10 or less, good hole expansibility may be obtained. Accordingly, r30 is set to 1.10 or less.

The lower limit of r30 may be 0.70 or more to obtain further excellent hole expansibility.

r value (rL) in Rolling Direction, and r Value (r60) in Direction Forming Angle of 60° with Rolling Direction:

Furthermore, as a result of the intensive investigation by the present inventors, they have found that when the respective pole densities, which are described above, rC, and r30 are set within the above described ranges, at the same time, and rL and r60 satisfy rL≥0.70 and r60≤1.10, respectively, further excellent TS×λ is capable of being obtained. Accordingly, rL may be 0.70 or more, and r60 may be 1.10 or less.

With regard to the upper limit of rL and the lower limit of r60, which are described above, rL may be 1.10 or less, and r60 may be 0.70 or more so as to obtain further excellent hole expansibility.

The above-described each r value is evaluated by a tensile test using a tensile test specimen of JIS No. 5. In consideration of a common high-strength steel sheet, the r value may be evaluated within a range in which tensile strain is within a range of 5% to 15% and within a rang in which corresponds to uniform elongation.

However, generally, it is known that the texture and the r value have a correlation with each other, but in the cold-rolled steel sheet related to the embodiment, as already mentioned, the limitation for the pole density of the crystal orientation and the limitation for the r value are different from each other. Therefore, when both of the limitations are satisfied concurrently, further excellent local deformability may be obtained.

Next, a microstructure of the cold-rolled steel sheet related to the embodiment will be described.

A basic microstructure of the cold-rolled steel sheet related to the embodiment includes ferrite, bainite, and retained austenite. In the embodiment, in addition to the basic components of the microstructure (in place of a part of ferrite, bainite, and retained austenite), one or more kinds among pearlite, martensite, and tempered martensite may be further included in the microstructure as a selective component of the microstructure as necessary or in an unavoidable manner. In addition, in the embodiment, an individual microstructure is evaluated by an area ratio.

Ferrite and bainite concentrate C in the retained austenite, and thus ferrite and bainite are necessary for improvement of elongation by the TRIP effect. Furthermore, ferrite and bainite also contribute to improvement of hole expansibility. The fraction of ferrite and the fraction of bainite may be allowed to vary depending on a strength level that is an aim of development, but when ferrite is set to from 5% to 80% and bainite is set to from 5% to 80%, excellent ductility and excellent hole expansibility may be obtained. Accordingly, ferrite is set to from 5% to 80%, and bainite is set to from 5% to 80%.

The retained austenite is a structure that increases ductility, particularly, uniform elongation by transformation induced plasticity, and it is necessary for the retained austenite to be 2% or more in terms of an area ratio. In addition, the retained austenite is transformed to martensite by processing, and also contributes to improvement of strength. The higher the area ratio of the retained austenite is, the more preferable it is. However, it is necessary to increase the content of C and Si so as to secure retained austenite exceeding 30% in terms of an area ratio, and in this case, weldability or surface qualities deteriorate. Therefore, the upper limit of the area ratio of the retained austenite is set to 30% or less. In addition, in a case where it is necessary to further increase the uniform elongation, it is preferable that the retained austenite is 3% or more, more preferably 5% or more, and still more preferably 8% or more.

When martensite is generated to a certain degree during cooling before a start of bainitic transformation, an effect of promoting bainitic transformation or an effect of stabilizing retained austenite may be obtained. The martensite is tempered by reheating, and thus tempered martensite may be included in the microstructure as necessary. However, when the tempered martensite exceeds 60% in terms of area ratio, ductility decreases, and thus the tempered martensite is limited to 60% or less in terms of area ratio.

In addition, the microstructure may include pearlite within a range of 10% or less and martensite within a range of 20% or less as necessary, respectively. When the amount of pearlite and the amount of martensite increase, workability or local deformability of the steel sheet decreases, or a utilization rate of C that generates a retained austenite decreases. Therefore, in the microstructure, pearlite is limited to 10% or less, and martensite is limited to 20% or less.

Here, the area ratio of austenite may be determined from diffraction intensity that may be obtained by performing X-ray diffraction with respect to a plane, which is parallel with a sheet surface, in the vicinity of ¼ sheet-thickness position.

In addition, the area ratio of ferrite, pearlite, bainite, and martensite may be determined from an image that may be obtained by observing within a range of ⅛ to ⅜ of sheet thickness (that is, a sheet-thickness range in which ¼ sheet-thickness position becomes the center) using an FE-SEM (Field Emission Scanning Electron Microscope). In the FE-SEM observation, a sample is collected in such a manner that a sheet-thickness cross-section parallel with the rolling direction of the steel sheet becomes an observation surface, and polishing and Nital etching are performed with respect to the observation surface.

In addition, with regard to the sheet-thickness direction, in the vicinity of the surface of the steel sheet and in the vicinity of the center of the steel sheet, the microstructure (components) of the steel sheet may be largely different from other portions due to decarburization and Mn precipitation. Therefore, in the embodiment, the observation of the microstructure is performed at the ¼ sheet-thickness position, which is the reference.

Furthermore, in a case of further improving the elongation, the size of the grain in the microstructure, particularly, a volume average diameter may be made fine. Furthermore, by making refinement of the volume average diameter, fatigue properties (fatigue limit ratio) that are necessary for steel sheets for vehicles are improved.

The number of coarse grains has a higher influence on the elongation compared to fine grains, and thus the elongation has a close correlation with a volume-average diameter calculated as a weighted average volume compared to a number-average diameter. Therefore, in a case of obtaining the above-described effect, the volume-average diameter may be from 2 μm to 15 μm, and more preferably from 2 μm to 9.5 μm.

In addition, when the volume-average diameter decreases, local strain concentration that occurs in a micrometer order is suppressed, and thus strain during local deformation may be dispersed. Accordingly, it is considered that elongation, particularly, uniform elongation is improved. In addition, when the volume-average diameter decreases, a grain boundary, which is serving as a barrier of dislocation motion, may be appropriately controlled. In addition, the grain boundary acts on repetitive plastic deformation (fatigue phenomenon) that occurs due to the dislocation motion, and thus fatigue properties are improved.

In addition, the diameter of an individual grain (grain unit) may be determined as follows.

Pearlite is specified by structure observation using an optical microscope. In addition, the grain units of ferrite, austenite, bainite, martensite, and tempered martensite are specified by EBSD. When a crystal structure of a region which is determined by the EBSD is a face-centered cubic structure (fcc structure), this region is determined as austenite. In addition, when a crystal structure of a region which is determined by the EBSD is a body-centered cubic structure (bcc structure), this region is determined as any one of ferrite, bainite, martensite, and tempered martensite. Ferrite, bainite, martensite, and tempered martensite may be distinguished using a KAM (Kernel Average Misorientation) method that is equipped to EBSP-OIM (registered trademark, Electron Back Scatter Diffraction Pattern-Orientation Image Microscopy). In the KAM method, a difference in orientation between respective pixels is averaged in a first approximation (total seven pixels) in which an arbitrary regular hexagonal pixel (central pixel) among measurement data, six pixels that are adjacent to the pixel are used, in a second approximation (total 19 pixels) in which 12 pixels positioned further outside the six pixels are also used, or in a third approximation (total 37 pixels) in which 18 pixels positioned further outside the 12 pixels are also used. Then, an average value that is obtained is determined as a value of the central pixel, and this operation is performed with respect to the entirety of the pixels. When the calculation according to the KAM method is performed without exceeding a grain boundary, a map, which is expressing an intragranular orientation variation, may be created. This map shows a strain distribution based on the local intragranular orientation variation.

In the embodiment, the orientation difference between adjacent pixels is calculated by the third approximation in the EBSP-OIM (registered trademark). The grain size of ferrite, bainite, martensite, and austenite may be obtained as follows. For example, the above-described orientation measurement is performed at a measurement step of 0.5 μm below with a magnification of 1,500 times, a position at which the orientation difference between measurement points, which are adjacent to each other, exceeds 15° is determined as a grain boundary (this grain boundary may not be a general grain boundary), and an equivalent circle diameter is calculated to obtain the grain size. In a case where pearlite is included in the microstructure, with respect to an image obtained by an optical microscope, the pearlite grain size may be calculated by applying an image processing method such as binarization processing and an intercept method.

In the grain (grain unit) defined as described above, in a case where an equivalent circle radius (a half value of the equivalent circle diameter) is set to r, the volume of an individual grain may be obtained by $4 \times \pi \times r^3 / 3$, and a volume average diameter may be obtained by a weighted average of the volume.

In addition, a coarse grain fraction to be described below may be obtained by dividing the area ratio of the coarse grain, which is obtained by the method, by an area of an object to be measured.

Furthermore, an equiaxed grain fraction to be described below may be obtained by dividing the area ratio of the equiaxed grain, which is obtained by the method, by an area of an object to be measured.

Furthermore, in a case of further improving hole expansibility, with respect to total components of the microstructure, a ratio of an area (coarse grain fraction) occupied by a grain (coarse grain) having a grain size, which is exceeding 35 μm per a unit area, may be limited to 10% or less. When a grain having a large grain size increases, tensile strength decreases, and thus local deformability also decreases. Therefore, it is preferable to make the grain as fine as possible. Furthermore, when all grains are uniformly and equivalently received a strain, hole expansibility is improved. Accordingly, local strain of the grain may be suppressed by limiting the amount of coarse grains.

The present inventors have continued an investigation for further higher local deformability. As a result, they have found the following fact. In a case where the respective pole densities, which are described above, (and r values) satisfy the above-described condition, and when equiaxial properties of the grain are excellent, directional dependency of a hole expanding process is small, and local deformability is further improved. Therefore, in a case of further improving local deformability, the equiaxed grain fraction, that is an index indicating the equiaxial properties, may be set to from 50% to 100%. When the equiaxed grain fraction is 50% or more, deformability in an L direction, that is a rolling direction, and deformability in a C direction, that is orthogonal to the rolling direction, becomes relatively uniform, and thus local deformability is improved. In addition, the equiaxed grain fraction represents a proportion of a grain (equiaxed grain), which is having excellent equiaxial properties, among grains (for example, total grains) in the microstructure of the steel sheet, in which a value (dL/dt) obtained by dividing the length dL of the grain in the rolling direction by the length dt of the grain in the sheet thickness direction is 3.0 or less.

Vickers hardness of bainite has an influence on tensile strength. Along with the progress of bainitic transformation, retained austenite stabilizes and the retained austenite contributes to improvement of elongation. Furthermore, when the hardness of bainite is 180 HV or more, the tensile strength and hole expansibility may be further improved. So as to obtain a good balance between tensile strength and hole expansibility, and a good balance between tensile strength and elongation, the Vickers hardness of bainite may be set to 180 HV or more. In addition, Vickers hardness is measured using a micro-Vickers measuring device.

C (average concentration of C) in retained austenite largely contributes to stability of retained austenite. When the average concentration of C in the retained austenite is 0.9% or more, sufficient stability of retained austenite may be obtained. Accordingly, the TRIP effect may be effectively obtained, and thus elongation is improved. Therefore, the average concentration of C in the retained austenite may be 0.9% or more.

The average concentration of C in the retained austenite is obtained by X-ray diffraction. That is, in X-ray analysis using Cu—Kα rays, a lattice constant a (unit is angstrom) is obtained from a reflection angle of a plane (200), a plane (220), and a plane (311) of austenite, and according to the following Expression 10, a carbon concentration Cγ in retained austenite may be calculated.

$$C\gamma=(a-3.572)/0.033 \quad \text{(Expression 10)}$$

Next, the reason why the chemical components (chemical elements) of the cold-rolled steel sheet related to the embodiment are limited will be described. Here, "%" in the content of respective chemical components represents "by mass %".

C: 0.02% to 0.4%

C is necessary to secure high strength and retained austenite. So as to obtain a sufficient amount of retained austenite, it is preferable that the C content, which is included in steel, is 0.02% or more. On the other hand, when the steel sheet excessively includes C, weldability deteriorates, and thus the upper limit of the C content is set to 0.4%. In a case of further improving strength and elongation, it is preferable that the C content is 0.05% or more, more preferably 0.10% or more, and still more preferably 0.12% or more. In addition, in a case of further improving weldability, it is preferable that the C content is 0.38% or less, and more preferably 0.36% or less.

Si: 0.001% to 2.5%

Si is a deoxidizer, and it is preferable that the Si content, which is included in steel, is 0.001% or more. In addition, Si stabilizes ferrite during annealing, and suppresses cementite precipitation during bainitic transformation (during retention within a range of a predetermined temperature). Accordingly, Si increases the concentration of C in austenite, and contributes to securement of retained austenite. The more the Si content is, the further the effect increases. However, when Si is excessively added to the steel, surface qualities, paintability, weldability, and the like deteriorate. Therefore, the upper limit of the Si content is set to 2.5%. In a case that an effect of obtaining stable retained austenite is sufficiently exhibited by Si, it is preferable that the Si content is 0.02% or more, more preferably 0.50% or more, and still more preferably 0.60% or more. In addition, in a case of further securing the surface qualities, paintability, weldability, and the like, it is preferable that the Si content is 2.2% or less, and more preferably 2.0% or less.

Mn: 0.001% to 4.0%

Mn is an element that stabilizes austenite, and increase hardenability. So as to secure sufficient hardenability, it is preferable that the Mn content, which is included in steel, may be 0.001% or more. On the other hand, when Mn is excessively added in the steel, ductility deteriorates, and thus the upper limit of the Mn content is set to 4.0%. In a case of securing further higher hardenability, it is preferable that the Mn content is 0.1% or more, more preferably 0.5% or more, and still more preferably 1.0% or more. In addition, in a case of securing further higher ductility, it is preferable that the Mn content is 3.8% or less, and more preferably 3.5% or less.

P: 0.15% or less

P is an impurity, and when P is excessively included in steel, ductility or weldability deteriorates. Therefore, the upper limit of the P content is set to 0.15%. In addition, P operates as a solid-solution hardening element, but P is unavoidably included in steel. Accordingly, it is not necessary to particularly limit the lower limit of the P content, and the lower limit is 0%. In addition, when considering recent general refining (including secondary refining), the lower limit of the P content may be 0.001%. In a case of further increasing ductility and weldability, it is preferable that the P content is 0.10% or less, and more preferably 0.05% or less.

S: 0.03% or less

S is an impurity, and when S is excessively contained in steel, MnS that extended by hot-rolling is generated. Therefore, formability such as ductility and hole expansibility deteriorates. Therefore, the upper limit of the S content is set to 0.03%. In addition, since S is unavoidably included in steel, it is not necessary to particularly limit the lower limit of the S content, and the lower limit is 0%. In addition, when considering recent general refining (including secondary refining), the lower limit of the S content may be 0.0005%. In a case of further increasing ductility and hole expansibility, it is preferable that the S content is 0.020% or less, and more preferably 0.015% or less.

N: 0.01% or less

N is an impurity, and when the N content exceeds 0.01%, ductility deteriorates. Therefore, the upper limit of the N content is set to 0.01% or less. In addition, since N is unavoidably included in steel, it is not necessary to particularly limit the lower limit of the N content, and the lower limit is 0%. In addition, when considering recent general refining (secondary refining), the lower limit of the N content may be 0.0005%. In a case of further increasing ductility, it is preferable that the N content be 0.005% or less.

Al: 0.001% to 2.0%

Al is a deoxidizer, and when considering recent general refining (including secondary refining), it is preferable that the content Al, which is included in steel, is 0.001% or more. In addition, Al stabilizes ferrite during annealing, and suppresses cementite precipitation during bainitic transformation (during retention within a range of a predetermined temperature). Accordingly, Al increases the concentration of C in austenite, and contributes to securement of retained austenite. When the Al content is increasing, the effect further increases. However, when Al is excessively added to steel, surface qualities, paintability, weldability, and the like deteriorate. Therefore, the upper limit of the Al content is set to 2.0%. In a case that an effect of obtaining stable retained austenite is sufficiently exhibited by Al, it is preferable that the Al content is 0.01% or more, and more preferably 0.02% or more. In addition, in a case of further securing the surface qualities, paintability, weldability, and the like, it is preferable that the Al content is 1.8% or less, and more preferably 1.5% or less.

O: 0.01% or less

O (oxygen) is an impurity, and when the O content exceeds 0.01%, ductility deteriorates. Therefore, the upper limit of the O content is set to 0.01%. In addition, since O is unavoidably contained in steel, it is not necessary to particularly limit the lower limit of the O content, and the lower limit is 0%. In addition, when considering recent general refining (including secondary refining), the lower limit of the O content may be 0.0005%.

Si+Al: 1.0% to 4.5%

These elements are deoxidizers as described above, and it is preferable that the sum of the Si content and the Al content is 1.0% or more. In addition, both Si and Al stabilize ferrite during annealing, and suppress cementite precipitation during bainitic transformation (during retention within a range of a predetermined temperature). Accordingly, these elements increase the concentration of C in austenite, and contribute to securement of retained austenite. However, when these elements are excessively added to steel, surface qualities, paintability, weldability, and the like deteriorate, and thus the sum of the Si content and the Al content is set to 4.5% or less. In a case of further increasing surface qualities, paintability, weldability, and the like, it is preferable that the sum is 4.0% or less, more preferably 3.5% or less, and still more preferably 3.0% or less.

The above-described chemical elements are basic components (basic elements) of steel in the embodiment, and the chemical composition in which the basic elements are controlled (included or limited), and in which the balance including of Fe and unavoidable impurities is a basic composition of the embodiment. However, in the embodiment, in addition to the basic components (in place of a part of Fe of the balance), the following chemical elements (selective elements) may be further included in steel as necessary. In addition, even when the selective elements are unavoidably included (for example, in an amount less than the lower limits of the amounts of the respective selective elements) in steel, the effect in the embodiment does not deteriorate.

That is, the cold-rolled steel sheet related to the embodiment may include one or more kinds among Ti, Nb, B, Mg, REM, Ca, Mo, Cr, V, W, Ni, Cu, Co, Sn, Zr, and As as a selective element to improve local formability, for example, by inclusions control or precipitates refinement.

Ti, Nb, B, Cu, and W improve a material quality through a mechanism such as fixation of carbon and nitrogen, precipitation strengthening, microstructure control, and refinement strengthening. Accordingly, one or more kinds among Ti, Nb, B, Cu, and W may be added to steel as necessary. In this case, with regard to the lower limits of the contents of the respective chemical elements, the Ti content is preferably 0.001% or more, the Nb content is preferably 0.005% or more, the B content is preferably 0.0001% or more, the Cu content is preferably 0.001% or more, and the W content is preferably 0.001% or more. However, even when these chemical elements are excessively added to the steel, remarkable effect is not obtained, and conversely, workability and manufacturability deteriorate. Therefore, with regard to the upper limits of the contents of the respective chemical elements, the Ti content is limited to 0.2% or less, the Nb content is limited to 0.2% or less, the B content is limited to 0.005% or less, the Cu content is limited to 2.0% or less, and the W content is limited to 1.0% or less. In addition, in consideration for cost reduction of alloy, it is not necessary to purposely add these chemical elements to steel, and all of the lower limits of the Ti content, the Nb content, the B content, the Cu content, and the W content are 0%.

Mg, REM (Rare Earth Metal), and Ca are important selective elements to improve local deformability of the steel sheet by controlling inclusions into a harmless shape. Accordingly, one or more kinds among Mg, REM, and Ca may be added to steel as necessary. In this case, all of the lower limits of the amounts of the respective chemical elements are preferably 0.0001%. On the other hand, when these chemical elements are excessively added to steel, cleanliness deteriorates. Therefore, with regard to the upper limits of the amounts of the respective chemical elements, the Mg content is limited to 0.01% or less, the REM content is limited to 0.1% or less, and the Ca content is limited to 0.01% or less. In addition, in consideration for cost reduction of alloy, it is not necessary to purposely add these chemical elements to the steel, and all of the lower limits of the Mg content, the REM content, and the Ca content are 0%.

Mo and Cr have an effect of increasing mechanical strength or an effect of improving a material quality, and thus one or both of Mo and Cr may be added to steel as necessary. In this case, with regard to the lower limits of the amounts of the respective chemical elements, the Mo content is preferably 0.001% or more, and the Cr content is preferably 0.001% or more. However, when these chemical elements are excessively added to steel, workability conversely deteriorates. Therefore, with regard to the upper limits of the amounts of the respective chemical elements, the Mo content is limited to 1.0%, and the Cr content is limited to 2.0%. In addition, in consideration for cost reduction of alloy, it is not necessary to purposely add these chemical elements to steel, and all of the lower limits of the Mo content and the Cr content are 0%.

V is effective for precipitation strengthening, and a deterioration generation for hole expansibility, which is caused by the precipitation strengthening, is small, and thus V is a selective element effective for a case in which good hole expansibility and high strength is necessary. Accordingly, V may be added to steel as necessary. In this case, it is preferable that the V content is 0.001% or more. However, when V is excessively added to steel, workability deteriorates, and thus the V content is limited to 1.0% or less. In addition, in consideration for cost reduction of alloy, it is not necessary to purposely add V to steel, and the lower limit of the V content is 0%.

Ni, Co, Sn, Zr, and As are selective elements that increase strength, and thus one or more kinds among Ni, Co, Sn, Zr, and As may be added to steel as necessary. In this case, as the effective contents (lower limits of the amounts) of the respective chemical elements, the Ni content is preferably 0.001% or more, the Co content is preferably 0.0001% or more, the Sn content is preferably 0.0001% or more, the Zr content is 0.0001% or more, and the As content is preferably 0.0001% or more. However, when these chemical elements are excessively added to steel, formability is lost. Therefore, with regard to the upper limits of the amounts of the respective chemical elements, the Ni content is limited to 2.0% or less, the Co content is limited to 1.0% or less, the Sn content is limited to 0.2% or less, the Zr content is limited to 0.2% or less, and the As content is limited to 0.5% or less. In addition, in consideration for cost reduction of alloy, it is not necessary to purposely add these chemical elements to steel, and all of the lower limits of the Ni content, the Co content, the Sn content, the Zr content, and the As content are 0%.

As described above, the cold-rolled steel sheet related to the embodiment has a chemical composition including the above-described basic elements, the balance consisting of Fe and unavoidable impurities, or a chemical composition including the above-described basic elements and at least one kind selected from the above-described selective elements, the balance consisting of Fe and unavoidable impurities.

In the embodiment, a hot-dip galvanizing treatment or an alloying treatment after galvanizing may be performed on a surface of the above-described cold-rolled steel sheet, and thus the cold-rolled steel sheet may have a hot-dip galvanized layer or a galvannealed layer on a surface thereof.

Furthermore, in the embodiment, the cold-rolled steel sheet (including a hot-dip galvanized steel sheet and a galvannealed steel sheet) may be subjected to various kinds of surface treatments (electro coating, hot-dip coating, deposition coating, a chromate treatment, a non-chromium treatment, a laminating treatment, a treatment using various kinds of salts, and the like), and thus the cold-rolled steel sheet may have a metal film (a coating or the like) or an organic film (a laminated film or the like) on a surface thereof.

In addition, in the embodiment, the sheet thickness of the cold-rolled steel sheet is not particularly limited, but for example, the sheet thickness may be from 0.5 mm to 2.5 mm, or from 0.5 mm to less than 2.0 mm. In addition, the strength of the cold-rolled steel sheet is also not particularly limited, and for example, the tensile strength may be from 440 MPa to 1,500 MPa.

Next, a production method of the cold-rolled steel sheet related to an embodiment of the present invention will be described.

To realize excellent hole expansibility and excellent elongation, it is important to form a texture (non-developed texture) which has a pole density of less anisotropy. Therefore, details of production conditions that the cold-rolled steel sheet, which is produced, satisfies the above-described conditions of the respective pole densities will be described below.

A production method preceding hot-rolling is not particularly limited. For example, various kinds of secondary refining may be performed subsequently to smelting and refining using a blast furnace, an electric furnace, a converter, or the like to melt steel which is satisfying the above-described chemical composition, whereby steel (molten steel) may be obtained. Then, to obtain a steel ingot or slab from the steel, for example, the steel may be casted by casting methods such as a common continuous casting method, an ingot method, and a thin slab casting method. In the case of the continuous casting, the steel may be hot-rolled after cooling the steel once to a low temperature (for example, room temperature), and reheating the steel. Alternatively, steel (casted slab) immediately after being casted may be continuously hot-rolled. In addition, as a raw material of steel (molten steel), scrap may be used.

In addition, in hot-rolling to be described later, after a rough rolling, a finish rolling may be continuously performed after jointing a sheet bar. At this time, a rough bar may be coiled at once into a coil, and may be stored in a cover having a heat retention function as necessary, and jointing may be performed after re-coiling the coil again.

To obtain a high-strength steel sheet that is excellent in local deformability, it is preferable to satisfy the following conditions.

First, so as to increase local deformability, an austenite grain size after rough rolling, that is, before finish rolling is important. That is, it is preferable that the austenite grain size before finish rolling is small. In addition, it has been proven that when an average austenite grain size before finish rolling is 200 μm or less, this is effective to secure sufficient local deformability. Furthermore, in a case that rC and r30 are effectively controlled in a range of 0.70 or more and 1.10 or less, respectively, the average austenite grain size before finish rolling may be 200 μm or less.

Figure 5:
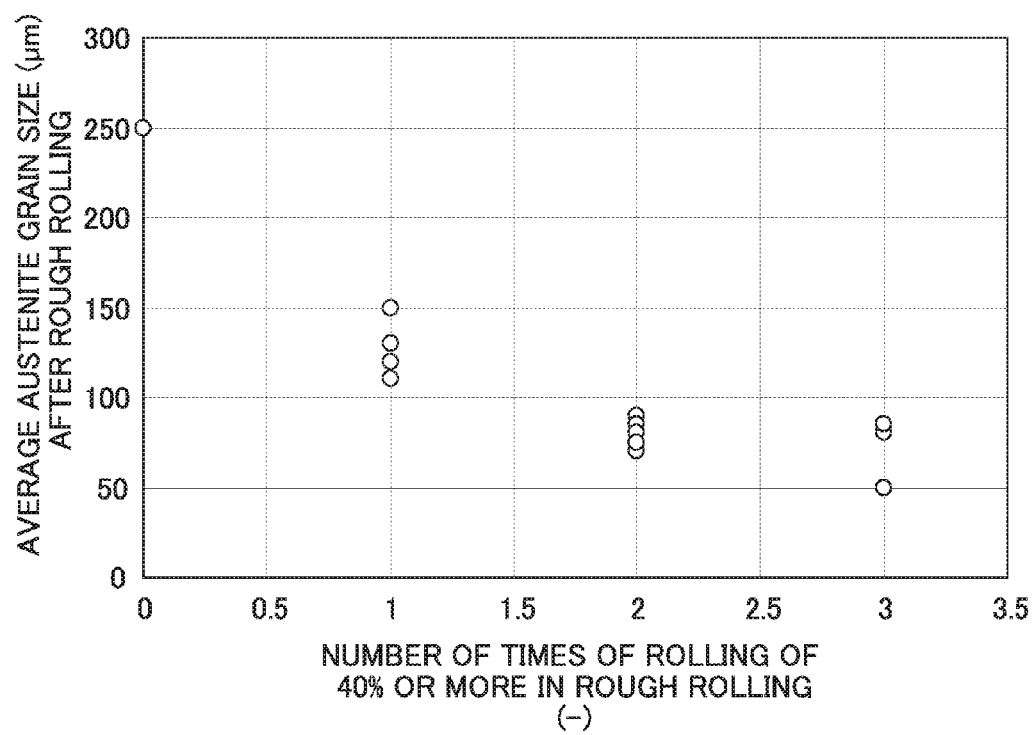
FIG. 5 is a diagram illustrating a relationship between a number of rolling times of 40% or more in rough rolling and an average austenite grain size after the rough rolling.

As shown in FIG. 5, to obtain an average austenite grain size of 200 μm or less before finish rolling, steel may be rolled one or more times (one or more passes) with a rolling reduction ratio of 40% or more by rough rolling (a first hot-rolling) within a temperature range of from 1,000° C. to 1,200° C. (preferably, 1,150° C. or lower).

As the rolling reduction ratio and the number of rolling reduction times increase, a further fine austenite grain may be obtained. For example, in the rough rolling, it is preferable to control the average austenite grain size to 100 μm or less. To perform the grain size control, it is preferable that a rolling in which a rolling reduction ratio of one pass is 40% or more may be performed two or more times (two or more passes). However, with regard to the rough rolling, when the rolling reduction ratio of one pass is limited to 70% or less, or the number of rolling reduction times (the number of passes) is limited to 10 times or less, a concern about a decrease of temperature or excessive generation of scales are capable of being reduced. Accordingly, the rolling reduction ratio of one pass in the rough rolling may be 70% or less, and the number of rolling reduction times (the number of passes) may be 10 times or less.

As described above, when the austenite grain size before finish rolling is made small, recrystallization of austenite in the subsequent finish rolling is promoted, and thus the reduction of the austenite grain size is effective to improve hole expansibility. In addition, the reduction of the austenite grain size before the finish rolling is also effective from the viewpoints of the control of rC and r30.

The effect is assumed to be because an austenite grain boundary after the rough rolling (that is, before the finish rolling) functions as one of recrystallization nuclei during finish rolling.

So as to confirm the austenite grain size after the rough rolling, it is preferable to rapidly cool the steel (steel sheet) before entering the finish rolling at a cooling rate as high as possible. For example, the steel sheet is cooled at an average cooling rate of 10° C./s or higher. Furthermore, a cross-section of a sheet piece collected from the steel sheet obtained after cooling is etched to make an austenite grain boundary in a microstructure emerge to the front, and then measurement using an optical microscope is performed. At this time, with respect to 20 viewing fields or more at a magnification of 50 times or more, the austenite grain size is measured by image analysis or an intercept method, and respective austenite grain sizes are averaged to obtain an average austenite grain size.

In addition, as one condition for controlling the average pole density of the orientation group from {100}<011> to {223}<110> and the pole density of the crystal orientation {332}<113> at the sheet thickness central portion within a range of the ⅝ to ⅜ of sheet thickness range to be within the above-described pole density ranges, rolling is controlled in the finish rolling (a second hot-rolling) after the rough rolling with a temperature T1 (° C.), which may be determined as shown in the following Expression 11 by a chemical composition (by mass %) of steel, set as a reference.

$T1=850+10\times([C]+[N])\times[Mn]+350\times[Nb]+250\times[Ti]+40\times[B]+10\times[Cr]+100\times[Mo]+100\times[V]$ (Expression 11)

In addition, in Expression 11, [C], [N], [Mn], [Nb], [Ti], [B], [Cr], [Mo], and [V] represent mass percentages of C, N, Mn, Nb, Ti, B, Cr, Mo, and V in the steel, respectively. In addition, calculation is performed while setting the amounts of chemical elements (chemical components) not contained in Expression 11 to 0%. Therefore, in the basic composition that contains only the above-described basic components, the following Expression 12 may be used instead of Expression 11.

$T1=850+10\times([C]+[N])\times[Mn]$ (Expression 12)

In addition, when steel includes selective elements, it is necessary for a temperature calculated by Expression 11 instead of the temperature calculated by Expression 12 to be set as T1 (° C.).

In the finish rolling, the temperature T1 (° C.) that may be obtained by Expression 11 or Expression 12 is set as a reference, a large rolling reduction ratio is secured in a temperature range of T1+30° C. to T1+200° C. (preferably, a temperature range of T1+50° C. to T1+100° C.), and the rolling reduction ratio is limited to a small range (including 0%) in a temperature range that is higher than or equal to $Ar_3$° C. and lower than T1+30° C. When the finish rolling is performed in addition to the rough rolling, local deformability of a final product may be raised.

That is, when the large rolling reduction ratio is secured in a temperature range of T1+30° C. to T1+200° C., and the rolling reduction ratio is limited in a temperature range that is equal to or higher than Ar$_3$° C. and lower than T1+30° C., the average pole density of the orientation group from {100}<011> to {223}<110> and the pole density of the crystal orientation {332}<113> at the sheet thickness central portion are sufficiently controlled. Accordingly, hole expansibility of the final product is dramatically improved.

The temperature T1 itself is empirically obtained. The present inventors have empirically found the following fact through experiment. That is, a temperature range in which recrystallization in an austenite range of each steel is promoted may be determined with the temperature T1 set as a reference. So as to obtain further excellent hole expansibility, it is important to accumulate a large amount of strain by rolling reduction, and thus an accumulative rolling reduction ratio within a temperature range of T1+30° C. to T1+200° C. is 50% or more. In addition, from the viewpoint of promoting recrystallization by strain accumulation, it is preferable that the accumulative rolling reduction ratio is 70% or more. In addition, when the upper limit of the accumulative rolling reduction ratio is limited, the rolling temperature may be further sufficiently secured, and thus a rolling load may be further suppressed. Accordingly, the accumulative rolling reduction ratio may be 90% or less.

Furthermore, so as to increase the elongation and local ductility of a final product due to raise the homogeneity of steel (hot-rolled original sheet), the finish rolling is controlled to include a large-rolling-reduction pass having a rolling reduction ratio of 30% or more in a temperature range of T1+30° C. to T1+200° C. to the limit. In this manner, in the finish rolling, in a temperature range of T1+30° C. to T1+200° C., at least one time of rolling reduction having a rolling reduction ratio of 30% or more is performed. Particularly, when considering the cooling control, to be described later, the rolling reduction ratio in the final pass in the temperature range is 30% or more. That is, it is preferable that the final pass is the large-rolling-reduction pass. In a case where further higher workability is required, the rolling reduction ratios of final two passes in a temperature range of T1+30° C. to T1+200° C. may be set to 30% or more, respectively. In a case of further raising homogeneity of a hot-rolled sheet, the rolling reduction ratio of the large-rolling-reduction pass (one pass) may be 40% or more. In addition, in a case of obtaining a further excellent shape of a steel sheet, the rolling reduction ratio of the large-rolling-reduction pass (one pass) may be 70% or less.

Furthermore, as one condition in which the above-described rL and r60 satisfy rL≥0.70, and r60≤1.10, in addition to an appropriate control of a standby time t to be described later, in the temperature range of T1+30° C. to T1+200° C., a temperature rising of a steel sheet between respective passes during rolling reduction is preferably suppressed to 18° C. or lower.

In addition, in the temperature range of T1+30° C. to T1+200° C., when the temperature rising of a steel sheet between respective rolling passes is suppressed, uniform recrystallized austenite may be obtained.

Furthermore, uniform recrystallization is promoted by release of accumulated strain. Accordingly, after rolling reduction in a temperature range of T1+30° C. to T1+200° C. is terminated, an amount of processing in a temperature range that is higher than or equal to Ar$_3$° C. and lower than T1+30° C. (preferably, T1° C. to lower than T1+30° C.) is suppressed to be as small as possible. Accordingly, the accumulative rolling reduction ratio in a temperature range that is higher than or equal to Ar$_3$° C. and lower than T1+30° C. is limited to 30% or less. In a case of securing excellent sheet shape in this temperature range, the accumulative rolling reduction ratio of 10% or more is preferable. However, in a case where high value is set on hole expansibility, it is preferable that the accumulative rolling reduction ratio is 10% or less, and more preferably 0%. That is, in a temperature range that is higher than or equal to Ar$_3$° C. and lower than T1+30° C., it is not necessary to perform the rolling reduction, and even when the rolling reduction is performed, the accumulative rolling reduction ratio is set to 30% or less.

In addition, when the rolling reduction ratio in a temperature range that is higher than or equal to Ar$_3$° C. and lower than T1+30° C. is large, recrystallized austenite grain is extended, and thus hole expansibility deteriorates.

That is, with regard to production conditions related to the embodiment, when austenite is uniformly and finely recrystallized in the finish rolling, the texture of a product is controlled. Accordingly, hole expansibility may be improved.

When rolling is performed in a temperature range lower than Ar$_3$° C., or the accumulative rolling reduction ratio in a temperature range that is higher than or equal to Ar$_3$° C. and lower than T1+30° C. is too large, the texture of austenite develops. As a result, a steel sheet that may be ultimately obtained does not satisfy at least one of a condition in which the average pole density of the orientation group from {100}<011> to {223}<110> in the sheet thickness central portion is 1.0 to 6.5, and a condition in which the pole density of the crystal orientation {332}<113> in the sheet thickness central portion is 1.0 to 5.0. On the other hand, in the finish rolling, when rolling is performed in a temperature range higher than T1+200° C., or the accumulative rolling reduction ratio is too small, coarse grains or mixed grains may be included in the microstructure, or the microstructure may be constituted by mixed grains. In addition, in this case, a coarse grain fraction or a volume-average diameter increases.

Here, the rolling reduction ratio may be obtained by actual results or calculation in measurement of a rolling load or a sheet thickness, and the like. In addition, a rolling temperature (for example, each of the temperature ranges above) may be obtained by actual measurement using a thermometer between stands, by calculation through a calculation simulation in consideration of processing heat generation due to a line speed, a rolling reduction ratio, or the like, or by performing both of them (actual measurement and calculation). In addition, in the above description, the rolling reduction ratio in one pass represents a percentage of a rolling reduction amount in one pass to an inlet sheet thickness before passing through a rolling stand (a difference between the inlet sheet thickness before passing through the rolling stand and an outlet sheet thickness after passing the rolling stand). When an inlet sheet thickness before the first pass in rolling in each of the temperature ranges is set as a reference, the accumulative rolling reduction ratio represents a ratio of an accumulative rolling reduction amount to the reference (a difference between the inlet sheet thickness before the first pass in the rolling in each of the temperature ranges and the outlet sheet thickness after a final pass in rolling in each of the temperature ranges). Furthermore, Ar$_3$ temperature is obtained by the following Expression 13.

$$Ar_3 = 879.4 - 516.1 \times [C] - 65.7 \times [Mn] + 38.0 \times [Si] + 274.7 \times [P]$$ (Expression 13)

With regard to the hot-rolling (finish rolling) that is performed as described above, the hot-rolling is terminated at a temperature higher than $Ar_3°$ C. When the hot-rolling is terminated at a temperature lower than $Ar_3$ (° C.), steel is rolled at a region of two phases (two-phase region) including austenite and ferrite, and thus integration of the crystal orientation to the orientation group from {100}<011> to {223}<110> becomes strong. As a result, hole expansibility significantly deteriorates. Here, when the rolling termination temperature of the finish rolling is T1° C. or higher, an amount of strain in a temperature range of T1° C. or lower may be reduced, and thus anisotropy may be further reduced. Accordingly, the rolling termination temperature of the finish rolling may be T1° C. or higher.

In addition, cooling (first cooling) after final large-rolling-reduction pass (rolling reduction at a rolling stand) of the rolling in a temperature range of T1+30° C. to T1+200° C. has a large effect on an austenite grain size, and the austenite grain size has a strong effect on an equiaxed grain fraction and a coarse grain fraction of a microstructure after cold-rolling and annealing.

Steel is cooled after a rolling stand corresponding to the final pass among the large-rolling-reduction passes in such a manner that a standby time t (second), which is taken before a first cooling initiation after completion of the final pass among the large-rolling-reduction passes (as described above, the large-rolling-reduction passes represent rolling reduction (pass) having a rolling reduction ratio of 30% or more in the temperature range of T1+30° C. to T1+200° C.) in the hot-rolling is completed, satisfies Expression 14 (the first cooling). Here, t1 in Expression 14 may be obtained by the following Expression 15. In Expression 15, Tf represents a temperature (° C.) of a steel sheet at the time of completion of the final pass in the large-rolling-reduction passes, and P1 represents a rolling reduction ratio (%) in the final pass among the large-rolling-reduction passes. Here, when considering operability (for example, shape correction or controllability of second cooling), the first cooling may be performed between rolling stands.

When the standby time t exceeds the right-side value (t1×2.5) of Expression 14, recrystallization is almost completed, on the other hand, a grain significantly are grown, and thus a grain size increases. Therefore, the r value (for example, rC and r30) and elongation significantly decrease. Accordingly, when the cooling initiation is controlled in such a manner that the standby time t satisfies the following Expression 14, a grain size is appropriately controlled. Therefore, the control of the cooling initiation has an effect on securing a sufficient elongation.

$$t \leq 2.5 \times t1 \qquad \text{(Expression 14)}$$

$$t1 = 0.001 \times ((Tf-T1) \times P1/100)^2 - 0.109 \times ((Tf-T1) \times P1/100) + 3.1 \qquad \text{(Expression 15)}$$

When the standby time t is further limited to be less than t1 seconds (the following Expression 16), the growth of the grain may be largely suppressed. In this case, a volume-average diameter of a final product is further decreased, and thus the limitation is effective to control the volume-average diameter to be 15 μm or less. As a result, even when the recrystallization does not sufficiently progress, elongation of the steel sheet may be further increased, at the same time, and fatigue properties may be improved.

$$t < t1 \qquad \text{(Expression 16)}$$

On the other hand, when the standby time t is further limited within a range of t1 seconds to 2.5×t1 seconds (the following Expression 17), the volume-average diameter increases compared to a case in which the standby time t is less than t1 seconds. However, recrystallization sufficiently progresses, and thus the crystal orientation becomes random. Accordingly, the elongation of the steel sheet may be sufficiently improved, at the same time, and isotropy may be largely improved.

$$t1 \leq t \leq 2.5 \times t1 \qquad \text{(Expression 17)}$$

In addition, the above-described first cooling may be performed between rolling stands or after the final stand. That is, after performing the first cooling, rolling having a low rolling reduction ratio (for example, 30% or less (or less than 30%)) may be performed in a temperature range of $Ar_3°$ C. or higher (for example, from $Ar_3$ (° C.) to T1+30 (or Tf) (° C.)).

It is preferable that a cooling temperature variation that is a difference between a steel sheet temperature (steel temperature) at the time of the cooling initiation and a steel sheet temperature (steel temperature) at the time of cooling termination in the first cooling is 40° C. to 140° C. In addition, it is preferable that the steel sheet temperature T2 at the time of the cooling completion of the first cooling is T1+100° C. or lower. When the cooling temperature variation is 40° C. or higher, grain growth of the recrystallized austenite grain may be further suppressed. And thus strength and elongation may be increased. When the cooling temperature variation is 140° C. or lower, recrystallization may be further sufficiently progressed, and thus the pole density may be further improved. Accordingly, hole expansibility may be further increased.

In addition, when the cooling temperature variation is limited to 140° C. or lower, the temperature of the steel sheet may be controlled in a relatively easy manner, and variant selection (avoiding of variant limitation) may be controlled in a relatively effective manner, and thus development of a texture may be further suppressed. Accordingly, in this case, isotropy may be further raised, and thus orientation dependence of workability may be further decreased. Furthermore, when the steel sheet temperature T2 at the time of the cooling termination of the first cooling is T1+100° C. or lower, a further sufficient cooling effect may be obtained. Due to the cooling effect, grain growth may be suppressed, and thus an increase of grain size may be further suppressed.

In addition, it is preferable that an average cooling rate in the first cooling is 50° C./s or more. When the average cooling rate in the first cooling is 50° C./s or more, grain growth of recrystallized austenite grain may be further suppressed. On the other hand, it is not necessary to particularly set the upper limit of the average cooling rate, but the average cooling rate may be 200° C./s or less from the viewpoint of a sheet shape.

In addition, other cooling conditions in a range from the termination of the first cooling to initiation of coiling (a second cooling) are not particularly limited, and according to the purpose, the microstructure may be flexibly controlled within a range of the above-described microstructure by setting a cooling pattern. In addition, for example, in a case of retaining the austenite grain size to be relatively fine, cooling (this cooling is included in the second cooling) may be performed after passing through the final rolling stand of a finish rolling mill. In this manner, the second cooling is performed subsequently to the first cooling. The second cooling may be initiated within 10 seconds after the first cooling is completed. In this manner, when the second cooling is initiated within 10 seconds after the first cooling completed, a grain may become further fine.

Furthermore, steel is cooled to a temperature of 650° C. or lower (this cooling is included in the second cooling), and then the steel (hot-rolled original sheet) is coiled in a temperature range of 650° C. or lower. When the steel is coiled before reaching the temperature of 650° C. or lower, anisotropy of a steel sheet after cold-rolling increases, and thus hole expansibility significantly decreases. The lower limit of a coiling temperature is not particularly limited, but the lower limit may be 350° C. or higher so as to suppress a cold-rolling load by suppressing the generation of martensite.

The hot-rolled original sheet that is produced as described above is cooled and is subjected to pickling, and then cold-rolling is performed at a rolling reduction ratio (a cold-rolling reduction ratio) of 30% to 90%. When the rolling reduction ratio is less than 30%, it is difficult to occur recrystallization in the subsequent annealing process, and thus a texture control (pole density control) by recrystallized ferrite to be described later becomes difficult. Furthermore, in this case, the equiaxed grain fraction decreases, and thus a grain after annealing becomes coarse. In addition, when the rolling reduction ratio exceeds 90%, a texture is developed during annealing, and thus anisotropy of a crystal orientation becomes strong. Therefore, the rolling reduction ratio of cold-rolling is set to from 30% to 90%. To control a grain to be further fine by further improving the equiaxed grain fraction, it is preferable that the rolling reduction ratio of cold-rolling is 40% or more. In addition, to further reduce anisotropy of a crystal orientation, it is preferable that the rolling reduction ratio of cold-rolling is 80% or less, more preferably 70% or less, and still more preferably 60% or less.

In a case where a strong texture is developed in a cold-rolled steel (steel sheet), even when subsequent annealing is performed, the texture has a tendency to be carried over to a microstructure after annealing. As a result, ductility and hole expansibility may deteriorate. Therefore, in a case of performing cold-rolling, in addition to a texture control of a hot-rolled steel sheet, it is necessary to weaken the texture, which is developed by cold-rolling, due to control the annealing conditions. The annealing effect is exhibited by performing two-step heating which is satisfying Expressions 19 and 20. The detailed reason why the texture and mechanical properties of the steel sheet may be appropriately controlled by the two-step heating is not clear. However, it is considered that an effect of weakening the texture has a relationship with recovery of dislocation introduced during cold-rolling and recrystallization. That is, when a heating rate within a temperature range of 650° C. to $Ac_1$° C. is high, ferrite is not recrystallized, and non-recrystallized ferrite as-worked remains during reverse transformation. In addition, when a steel including 0.01% of the C content, by mass %, is annealed at a two-phase region including ferrite and austenite, austenite that is formed blocks the growth of recrystallized ferrite, and non-crystallized ferrite has a tendency to remain after annealing. The non-recrystallized ferrite has a strong texture, and thus has a negative influence on local deformability. Furthermore, the non-crystallized ferrite contains much dislocation, and thus largely deteriorates ductility. Therefore, it is preferable that a heating rate within a temperature range of 650° C. to $Ac_1$° C. is low. However, since a driving force of recrystallization is a strain accumulation by rolling, in a case where a heating rate to 650° C. is low, the dislocation introduced by cold-rolling is recovered, and thus recrystallization does not occur. As a result, the texture which is developed during cold-rolling remains intact, and thus local deformability deteriorates.

Particularly, in a case where a heating rate within a temperature range of room temperature (for example, 25° C.) to 650° C. is low, a density of dislocation, which is included in the microstructure at the initiation of recrystallization, decreases. As a result, it takes a long time for recrystallization, and thus it is necessary to be low the heating rate within the temperature range of 650° C. to $Ac_1$° C. (it is necessary to be long a retention time of steel in a temperature region at which recrystallization occurs). Accordingly, two-step heating, which is satisfying Expressions 19 and 20, is performed during annealing. That is, an average heating rate HR1 (° C./s) in a temperature range (former step) of room temperature (for example, 25° C.) to 650° C. is 0.3° C./s or more, and an average heating rate HR2 (° C./s) in a temperature range (later step) of higher than 650° C. to $Ac_1$° C. is 0.5×HR1 (° C./s) or less. Here, the upper limit of the average heating rate HR1 at the former step and the lower limit of the average heating rate HR2 at the later step are not particularly limited, and for example, HR1 may be 200° C./s or less, and HR2 may be 0.15° C./s or more. In addition, the two-step heating may be carried out by continuous annealing equipment, continuous hot-dip galvanizing equipment, and continuous galvannealing equipment.

However, the texture, which is developed in the hot-rolled original sheet, is carried over even after cold-rolling and annealing. Therefore, in a case where the texture of the hot-rolled original sheet is not appropriately controlled, even when heating conditions during annealing are controlled to the above-described conditions, local deformability of a steel sheet deteriorates. Accordingly, as preconditions before cold-rolling and annealing, when hot-rolling is controlled by the above-described conditions to make the texture of a hot-rolled original sheet random, and then heating conditions during annealing are controlled to the above-described conditions, excellent ductility and excellent hole expansibility may be sufficiently improved.

Furthermore, the steel that is heated is retained within a temperature range of $Ac_1$° C. to 900° C. that is obtained by the two-step heating for 1 second to 300 seconds. At a temperature lower than $Ac_1$° C. or for a time shorter than 1 second, reverse transformation from a low-temperature phase such as ferrite to austenite does not sufficiently progress, and thus a second phase may not be obtained at a subsequent cooling process, and sufficient strength may not be obtained. Furthermore, in this case, the low-temperature phase such as ferrite and the texture after cold-rolling remain intact, and thus local deformability deteriorates. On the other hand, at a temperature higher than 900° C. or for a time longer than 300 seconds, a grain becomes coarse by the retention, and the r value or elongation decreases.

Here, $Ac_1$, the average heating rate HR1 at the former step, and the average heating rate HR2 at the later step may be obtained by the following Expression 18, Expression 19, and Expression 20, respectively.

$Ac_1 = 723 - 10.7 \times [Mn] - 16.9 \times [Ni] + 29.1 \times [Si] + 16.9 \times [Cr] + 290 \times [As] + 6.38 \times [W]$ (Expression 18)

$HR1 \geq 0.3$ (Expression 19)

$HR2 \leq 0.5 \times HR1$ (Expression 20)

Then, the steel is cooled to a temperature range of 580° C. to 780° C. at an average cooling rate of 1° C./s to 20° C./s (a third cooling, cooling at the first step). When the average cooling rate is less than 1° C./s or the cooling termination temperature is 780° C. or higher, a necessary ferrite fraction is not obtained, and elongation decreases. On the other hand, when the average cooling rate is 20° C./s or more, or the cooling termination temperature is lower than 580° C., pearlite is to be generated, and thus hole expansibility decreases.

Then, the steel is cooled to a temperature range of 350° C. to 500° C. at an average cooling rate of 5° C./s to 200° C./s (a fourth cooling, cooling at the second step). As one method, after the cooling, the steel is retained intact within a temperature range of 350° C. to 500° C. for a time of $t_{OA}$ seconds to 1,000 seconds. In addition, as another method, after the above-described cooling, the steel is further cooled as it is to 350° C. or lower (a fifth cooling), and then the steel is reheated to a temperature range of 350° C. to 500° C., and the steel is retained within a temperature range of 350° C. to 500° C. for a time of $t_{OA}$ seconds to 1,000 seconds. When the steel is retained for a time shorter than $t_{OA}$ seconds or at a temperature range that is lower than 350° C. or higher than 500° C., bainitic transformation does not sufficiently progress, and thus good hole expansibility may not be obtained. Among these conditions, when the steel is retained for a time shorter than $t_{OA}$ seconds or at a temperature range lower than 350° C., a large amount of martensite is to be generated, and thus not only hole expansibility but also elongation deteriorates. In addition, when the steel is retained at a temperature range higher than 500° C., a large amount of pearlite is to be generated, and thus hole expansibility further decreases. Furthermore, when the average cooling rate at the fourth cooling is set to 5° C./s or more, the generation of pearlite may be further suppressed. In addition, it is not necessary to particularly limit the upper limit of the average cooling rate at the fourth cooling, but the upper limit may be 200° C./s to increase temperature control accuracy.

Here, $t_{OA}$ may be obtained by the following Expression 21.

[Mathematical Expression 2]

$$t_{OA}=10^{0.0002(T_{OA}-425)^2+1.18} \qquad \text{(Expression 21)}$$

Here, $T_{OA}$ represents a retention temperature in a temperature range of 350° C. to 500° C.

In addition, with respect to the cold-rolled steel sheet that is obtained, skin pass rolling may be performed as necessary. According to the skin pass rolling, a stretcher strain that occurs during machining may be prevented, and a shape of a steel sheet may be corrected.

Furthermore, with respect to the cold-rolled steel sheet that is produced as described above, a hot-dip galvanizing treatment or a galvannealing treatment may be performed as necessary to form a hot-dip galvanized layer or a galvannealed layer on a surface of the cold-rolled steel sheet. In this case, before forming a coating layer, an atmosphere in a furnace may be controlled in such a manner that a logarithm ($\log(p_{H2O}/p_{H2})$) of a ratio of a partial water vapor pressure $p_{H2O}$ to a partial hydrogen pressure $p_{H2}$ satisfies −3.0 to 0.0, and annealing (for example, heating under the above-described predetermined conditions or retention within a predetermined temperature range) may be performed. According to the annealing, generation of a non-coated portion, which has a tendency to occur on a steel sheet, which is including the Si content, may be suppressed, or alloying may be promoted. Accordingly, a coating quality may be further raised.

Furthermore, various kinds of surface treatment as described above may be applied to the cold-rolled steel sheet that may be obtained.

Figure 9:
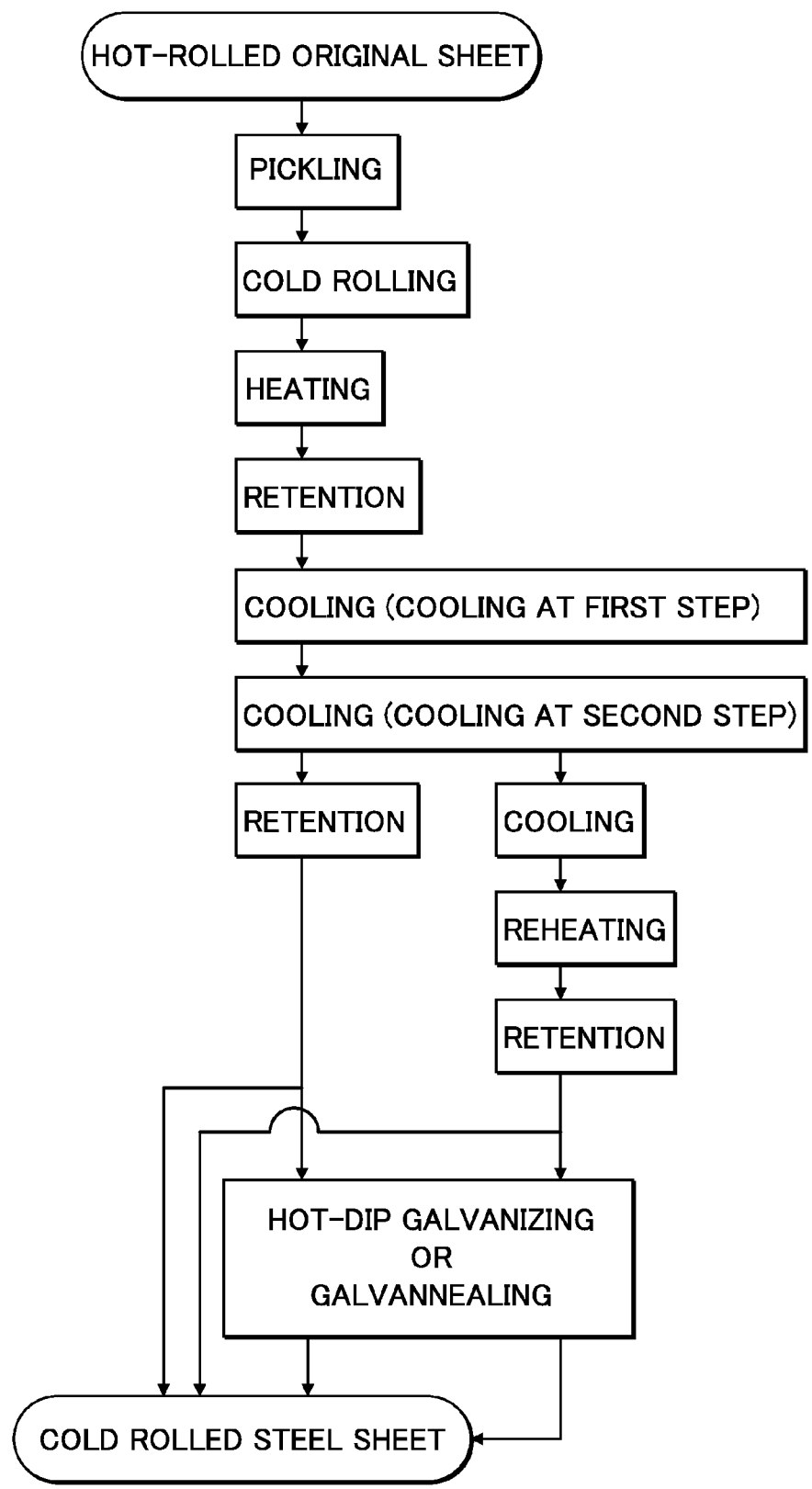
FIG. 9 is a flowchart illustrating the outline (the last half) of a production method of a cold-rolled steel sheet related to an embodiment of the present invention.

For reference, FIGS. 9 and 10 show a flowchart illustrating the outline of a production method the cold-rolled steel sheet related to the embodiment.

EXAMPLES

A technical content of the present invention will be described with reference to examples of the present invention.

Results of examination performed using Steel Nos. A to Y and Steel Nos. a to g having a chemical composition shown in Tables 1 to 3 (the balance includes Fe and unavoidable impurities) will be described.

The steel was melted and casted. Then, the steel was heated to a temperature range of 900° C. to 1,300° C. as it was, or the steel was heated to a temperature range of 900° C. to 1,300° C. after reheating the steel that was cooled at once to room temperature. Then, hot-rolling was performed while controlling a steel sheet temperature under production conditions shown in Tables 4 and 7. After the hot-rolling was terminated at a temperature higher than $Ar_3$, the steel was cooled. Then, the steel was coiled to obtain a hot-rolled original sheet having a thickness of 2 mm to 5 mm. Then, the steel (hot-rolled original sheet) was subjected to pickling, and was cold-rolled until a thickness of 1.2 mm to 2.3 mm. Then, so as to anneal, the steel was heated and retained. Then, the steel sheet that was obtained was cooled with two steps, and was retained. Then, with respect to the steel sheet, skin pass rolling was performed at 0.5% of a rolling reduction ratio to obtain a cold-rolled steel sheet. Here, the cold-rolled steel sheet was produced in such a manner that production conditions after the hot-rolling satisfied production conditions shown in Tables 8 to 11. In addition, with regard to Production No. A1, in addition to non-coated cold-rolled steel sheet (cold-rolled original sheet), a hot-dip galvanized steel sheet and a galvannealed steel sheet were also produced by forming a hot-dip galvanized layer and galvannealed layer on a surface of the steel sheet. In addition, in Production No. O2, rolling reduction having a rolling reduction ratio of 30% or more was not performed at the temperature range of T1+30° C. to T1+200° C., and thus it was impossible to calculate t1. Therefore, in Production No. O2, a rolling reduction ratio of a final pass at the temperature range of T1+30° C. to T1+200° C. was used as P1.

Chemical components of each steel are shown in Tables 1 to 3, and each production condition is shown in Tables 4 to 7, and Tables 8 to 11. In addition, a microstructure and mechanical properties of a steel sheet that was obtained are shown in Tables 12 to 15. In addition, in Tables 12 to 15, F, B, retained γ, M, P, and t-M represent area ratios of ferrite, bainite, retained austenite, martensite, pearlite, and tempered martensite respectively.

Figure 6:
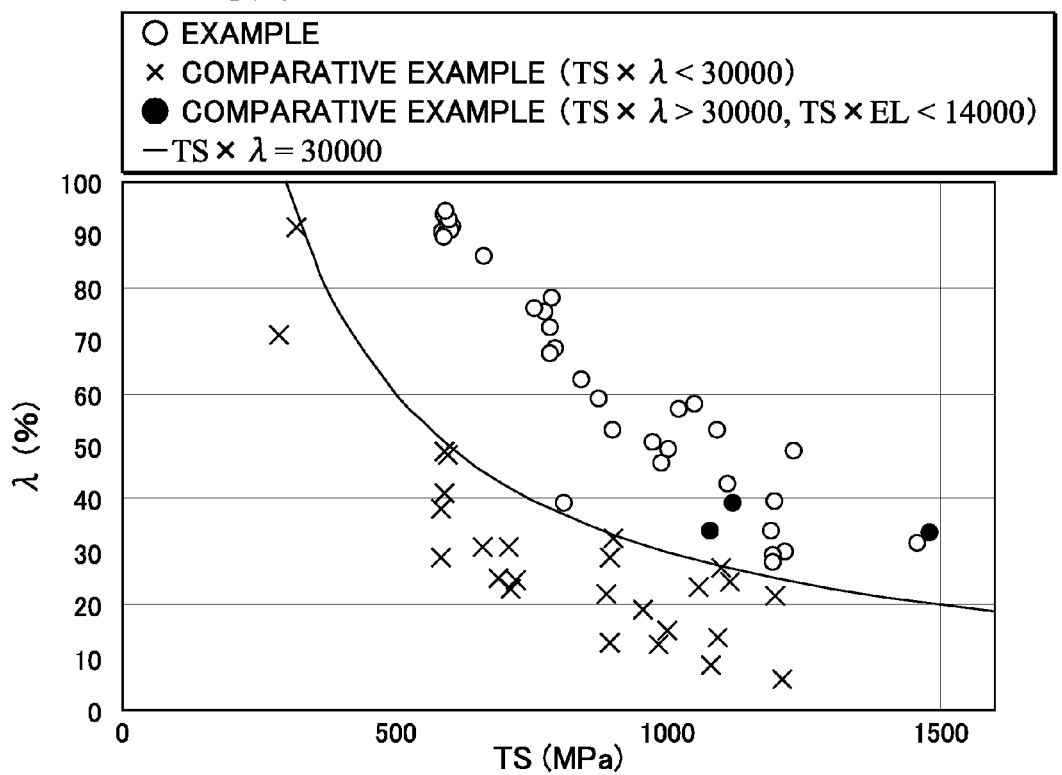
FIG. 6 is a diagram illustrating a relationship between tensile strength TS and hole expansibility λ in examples and comparative examples.
Figure 7:
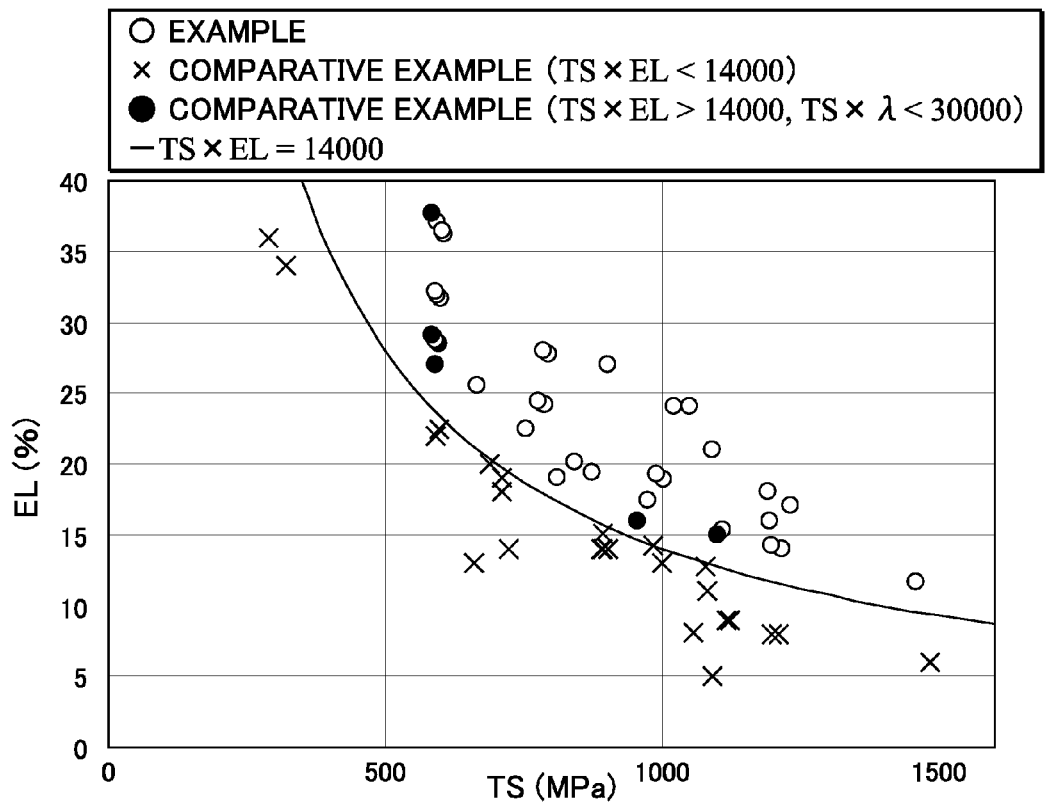
FIG. 7 is a diagram illustrating a relationship between tensile strength TS and elongation EL in examples and comparative examples.
Figure 8:
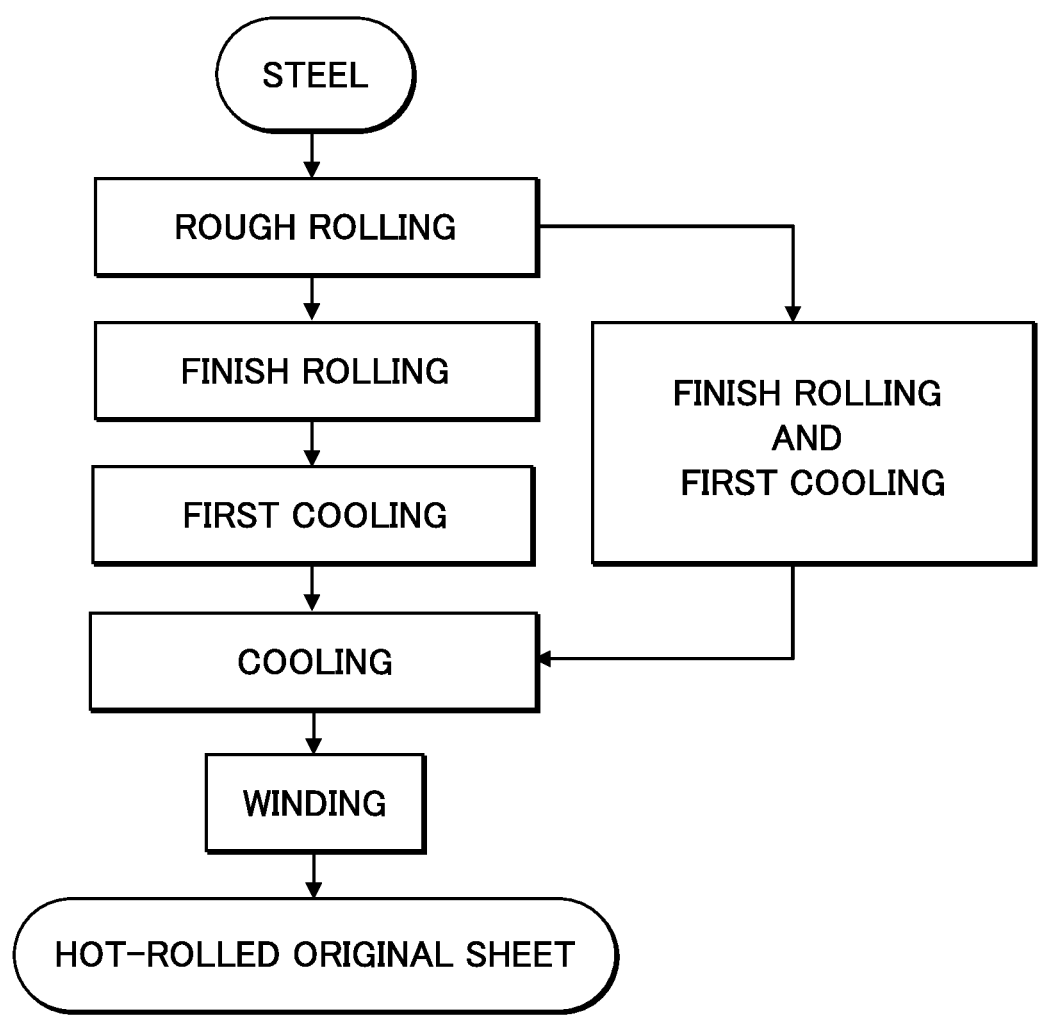
FIG. 8 is a flowchart illustrating the outline (the first half) of a production method of a cold-rolled steel sheet related to an embodiment of the present invention.

In addition, with regard to results that were obtained, a relationship between strength TS and hole expansibility λ is shown in FIG. 6, and a relationship between strength TS and elongation EL is shown in FIG. 7.

In addition, tensile strength TS, elongation (total elongation) EL, r values in respective directions (rL, rC, r30, and r60: according to JIS Z 2254 (2008) (ISO10113 (2006))) were determined by a tensile test according to JIS Z 2241. In addition, hole expansibility λ was determined by a hole expanding test according to Japan Iron and Steel Federation Standard JFS T1001. In addition, other conditions in the measurement of r values were the same as conditions of the embodiment.

In addition, with respect to the sheet thickness central portion, within a region of ⅝ to ⅜ of a sheet thickness cross-section, which is parallel with a rolling direction at a ¼ position in a sheet width direction, a pole density was measured at a pitch of 0.5 μm using the above-described EBSD.

As shown in FIGS. 6 and 7, it is capable of being understood that a steel sheet, in which a chemical composition and a microstructure (particularly, pole densities of respective crystal orientations) of the steel sheet are appropriately controlled, has both excellent hole expansibility and ductility. In addition, in a hot-dip galvanized steel sheet and a galvannealed steel sheet which were obtained in Production No. A1, the microstructure and mechanical properties of respective coated steel sheet were the same as the microstructure and mechanical properties of cold-rolled original sheets (Tables 12 to 15) corresponding to Production Nos.

TABLE 1

| Steel No. | Chemical component/mass % | | | | | | | | |
|---|---|---|---|---|---|---|---|---|---|
| | C | Si | Mn | P | S | N | Al | O | Si + Al |
| A | 0.168 | 1.40 | 2.05 | 0.001 | 0.007 | 0.0026 | 0.032 | 0.0032 | 1.43 |
| B | 0.191 | 1.33 | 2.25 | 0.001 | 0.005 | 0.0032 | 0.035 | 0.0023 | 1.36 |
| C | 0.255 | 0.97 | 1.55 | 0.002 | 0.007 | 0.0033 | 0.038 | 0.0026 | 1.01 |
| D | 0.380 | 2.46 | 3.80 | 0.001 | 0.005 | 0.0033 | 0.710 | 0.0021 | 3.17 |
| E | 0.280 | 0.75 | 1.35 | 0.002 | 0.005 | 0.0055 | 0.310 | 0.0029 | 1.06 |
| F | 0.144 | 1.05 | 3.20 | 0.012 | 0.003 | 0.0032 | 0.040 | 0.0038 | 1.09 |
| G | 0.266 | 0.90 | 1.54 | 0.001 | 0.002 | 0.0025 | 0.101 | 0.0029 | 1.00 |
| H | 0.111 | 0.57 | 2.20 | 0.001 | 0.029 | 0.0019 | 0.690 | 0.0023 | 1.26 |
| I | 0.211 | 1.87 | 1.88 | 0.001 | 0.003 | 0.003 | 0.030 | 0.003 | 1.90 |
| J | 0.263 | 1.70 | 1.46 | 0.001 | 0.003 | 0.0034 | 0.850 | 0.0031 | 2.55 |
| K | 0.303 | 1.00 | 2.52 | 0.001 | 0.002 | 0.0024 | 0.021 | 0.0031 | 1.02 |
| L | 0.360 | 2.03 | 1.78 | 0.001 | 0.003 | 0.0032 | 0.018 | 0.0028 | 2.05 |
| M | 0.177 | 0.62 | 1.40 | 0.001 | 0.003 | 0.0033 | 1.700 | 0.0034 | 2.32 |
| N | 0.140 | 1.29 | 2.82 | 0.001 | 0.003 | 0.0033 | 0.035 | 0.0022 | 1.33 |
| O | 0.281 | 1.38 | 2.20 | 0.001 | 0.003 | 0.0022 | 0.035 | 0.0035 | 1.41 |
| P | 0.361 | 1.11 | 2.77 | 0.001 | 0.003 | 0.0033 | 0.032 | 0.0036 | 1.14 |
| Q | 0.185 | 1.35 | 1.82 | 0.001 | 0.005 | 0.0032 | 0.025 | 0.0031 | 1.37 |
| R | 0.108 | 1.60 | 2.40 | 0.001 | 0.002 | 0.0022 | 0.033 | 0.0011 | 1.63 |
| S | 0.171 | 1.00 | 2.05 | 0.001 | 0.005 | 0.0029 | 0.025 | 0.0031 | 1.03 |
| T | 0.296 | 1.27 | 2.44 | 0.001 | 0.003 | 0.0032 | 0.030 | 0.0035 | 1.30 |
| U | 0.101 | 1.01 | 1.40 | 0.001 | 0.002 | 0.0033 | 0.003 | 0.0024 | 1.01 |
| V | 0.320 | 1.17 | 2.20 | 0.001 | 0.003 | 0.0021 | 0.028 | 0.0036 | 1.20 |
| W | 0.282 | 0.98 | 2.26 | 0.003 | 0.015 | 0.0027 | 0.033 | 0.0019 | 1.01 |
| X | 0.060 | 1.31 | 1.02 | 0.001 | 0.015 | 0.0041 | 0.018 | 0.0022 | 1.33 |
| Y | 0.151 | 1.60 | 0.88 | 0.002 | 0.007 | 0.0029 | 0.011 | 0.0031 | 1.61 |
| a | <u>0.610</u> | 1.05 | 2.20 | 0.001 | 0.003 | 0.0021 | 0.035 | 0.0012 | 1.09 |
| b | 0.177 | 1.00 | <u>4.50</u> | 0.020 | 0.003 | 0.0041 | 0.034 | 0.0015 | 1.03 |
| c | 0.178 | 1.27 | 2.00 | 0.001 | 0.003 | 0.0042 | 0.033 | 0.0034 | 1.30 |
| d | 0.165 | 0.99 | 2.40 | 0.001 | 0.003 | 0.0035 | 0.035 | 0.0026 | 1.03 |
| e | 0.201 | 1.01 | 1.00 | 0.001 | <u>0.067</u> | 0.0035 | 0.036 | 0.0022 | 1.05 |
| f | 0.164 | 1.10 | 2.20 | 0.001 | 0.003 | 0.0023 | 0.033 | 0.0036 | 1.13 |
| g | 0.290 | 0.97 | 1.90 | 0.001 | 0.003 | 0.0044 | 0.032 | 0.0035 | 1.00 |

TABLE 2

| Steel No. | Chemical component/mass % | | | | | | | | | | | | | | |
|---|---|---|---|---|---|---|---|---|---|---|---|---|---|---|---|
| | Ti | Nb | B | Mg | REM | Ca | Mo | Cr | V | W | Ni | Cu | Co | Sn | Zr | As |
| A | 0.02 | 0.02 | — | — | — | — | — | — | — | — | — | — | — | — | — | — |
| B | — | — | — | — | — | — | — | — | — | — | — | — | — | — | — | — |
| C | — | 0.04 | — | — | — | — | — | — | — | — | — | — | — | — | — | — |
| D | 0.02 | — | 0.0020 | — | 0.0035 | — | — | — | — | — | — | — | — | — | — | — |
| E | — | 0.02 | — | — | — | — | — | — | — | — | — | — | — | — | — | — |
| F | 0.03 | 0.07 | — | — | 0.0044 | — | — | 0.1 | — | — | — | — | — | — | — | — |
| G | — | 0.02 | — | — | — | — | — | — | — | — | — | — | — | — | — | — |
| H | 0.15 | 0.03 | — | — | 0.0005 | 0.0009 | — | — | — | 0.05 | — | — | — | — | — | — |
| I | — | — | — | — | — | — | — | — | — | — | — | — | — | — | — | — |
| J | — | — | — | — | — | — | — | — | — | — | — | — | — | — | — | — |
| K | 0.03 | — | — | — | — | — | — | — | — | — | — | — | — | — | — | — |
| L | — | — | 0.0002 | — | — | — | — | — | — | — | — | — | — | — | — | — |
| M | — | — | — | — | — | 0.0022 | — | 0.15 | — | — | — | — | — | — | — | — |
| N | — | — | — | — | — | — | — | — | — | — | — | — | — | — | — | — |
| O | 0.05 | — | — | — | — | — | — | 0.20 | — | — | — | — | — | — | — | 0.01 |
| P | 0.04 | — | — | 0.006 | — | 0.022 | — | 0.05 | — | — | — | — | — | — | — | — |
| Q | — | — | 0.0002 | — | — | — | — | — | — | — | — | 0.4 | — | — | — | — |
| R | 0.05 | 0.01 | — | 0.004 | 0.004 | — | 0.8 | — | — | — | — | — | — | — | — | — |
| S | — | — | — | — | — | — | — | — | — | — | — | — | — | 0.11 | — | — |
| T | 0.03 | — | 0.0002 | — | — | — | — | — | — | — | 1.4 | — | — | — | — | — |
| U | 0.10 | — | — | — | — | 0.01 | — | — | — | — | — | 1.1 | — | — | — | — |
| V | — | — | — | 0.004 | 0.005 | — | — | — | — | — | — | — | — | — | 0.18 | — |
| W | — | — | — | — | — | — | 0.88 | — | — | — | — | — | — | — | — | — |

TABLE 2-continued

| Steel No. | Ti | Nb | B | Mg | REM | Ca | Mo | Cr | V | W | Ni | Cu | Co | Sn | Zr | As |
|---|---|---|---|---|---|---|---|---|---|---|---|---|---|---|---|---|
| X | — | — | — | — | — | — | — | — | — | — | — | — | — | — | — | — |
| Y | — | — | — | — | — | — | — | 1.96 | — | — | — | — | — | — | — | — |
| a | — | — | — | — | — | — | — | — | — | — | — | — | — | — | — | — |
| b | — | — | — | — | — | — | — | — | — | — | — | — | — | — | — | — |
| c | 0.25 | — | — | — | — | — | — | — | — | — | — | — | — | — | — | — |
| d | — | 0.25 | — | — | — | — | — | — | — | — | — | — | — | — | — | — |
| e | — | — | — | — | — | — | — | — | — | — | — | — | — | — | — | — |
| f | — | — | — | 0.02 | — | — | — | — | 1.10 | — | — | — | — | — | — | — |
| g | — | — | — | — | 0.15 | — | — | — | — | — | — | — | — | — | — | — |

TABLE 3

| Steel No. | T1/°C. | Ar$_3$/°C. | Ac$_1$/°C. | Remarks |
|---|---|---|---|---|
| A | 865 | 712 | 742 | Example |
| B | 854 | 684 | 737 | Example |
| C | 868 | 683 | 735 | Example |
| D | 869 | 528 | 754 | Example |
| E | 862 | 675 | 730 | Example |
| F | 886 | 638 | 721 | Example |
| G | 860 | 675 | 733 | Example |
| H | 900 | 699 | 716 | Example |
| I | 854 | 718 | 757 | Example |
| J | 854 | 713 | 757 | Example |
| K | 865 | 596 | 725 | Example |
| L | 856 | 654 | 763 | Example |
| M | 868 | 720 | 726 | Example |
| N | 854 | 671 | 730 | Example |
| O | 889 | 642 | 743 | Example |
| P | 877 | 553 | 726 | Example |
| Q | 853 | 716 | 743 | Example |
| R | 877 | 727 | 757 | Example |
| S | 854 | 695 | 730 | Example |
| T | 865 | 615 | 710 | Example |
| U | 877 | 774 | 737 | Example |
| V | 857 | 615 | 734 | Example |
| W | 944 | 623 | 727 | Example |
| X | 851 | 831 | 750 | Example |
| Y | 871 | 805 | 793 | Example |
| a | 863 | 460 | 730 | Comparative Example |
| b | 858 | 536 | 704 | Comparative Example |
| c | 916 | 705 | 739 | Comparative Example |
| d | 942 | 674 | 726 | Comparative Example |
| e | 852 | 749 | 742 | Comparative Example |
| f | 964 | 692 | 731 | Comparative Example |
| g | 856 | 642 | 731 | Comparative Example |

TABLE 4

| | | Rolling at 1,000° C. to 1,200° C. | | | Rolling at T1 + 30° C. to T1 + 200° C. | | | |
|---|---|---|---|---|---|---|---|---|
| Production No. | Steel No. | Number of times of rolling reduction of 40% or more/— | Rolling reduction ratio of each rolling reduction of 40% or more/% | Austenite grain size/μm | Accumulative rolling reduction ratio/% | Number of times of rolling reduction/% | Number of times of rolling reduction of 30% or more/— | Rise of temperature between respective passes/°C. |
| A1 | A | 2 | 45/45 | 80 | 64 | 2 | 2 | 10 |
| A2 | A | 2 | 45/45 | 85 | 69 | 3 | 2 | 5 |
| A3 | A | 2 | 40/40 | 80 | 58 | 2 | 2 | 10 |
| A4 | A | 2 | 40/40 | 80 | 58 | 2 | 2 | 12 |
| A5 | A | 2 | 40/40 | 80 | 51 | 2 | 2 | 15 |
| B1 | B | 2 | 45/45 | 85 | 66 | 3 | 2 | 10 |
| B2 | B | 2 | 45/45 | 80 | 64 | 2 | 2 | 15 |
| B3 | B | 2 | 40/40 | 80 | 51 | 2 | 2 | 13 |
| B4 | B | 2 | 40/40 | 80 | 51 | 2 | 2 | 13 |
| B5 | B | 2 | 40/40 | 80 | 64 | 2 | 2 | 13 |
| C1 | C | 2 | 40/40 | 80 | 64 | 2 | 2 | 18 |
| C2 | C | 0 | — | 250 | 64 | 2 | 2 | 15 |
| D1 | D | 1 | 40 | 120 | 50 | 2 | 1 | 9 |
| D2 | D | 1 | 50 | 130 | 35 | 1 | 1 | 10 |
| E1 | E | 2 | 45/45 | 90 | 67 | 2 | 2 | 5 |
| E2 | E | 2 | 45/45 | 80 | 64 | 2 | 2 | 8 |
| F1 | F | 2 | 45/45 | 75 | 62 | 2 | 2 | 13 |
| F2 | F | 1 | 50 | 110 | 69 | 3 | 2 | 13 |
| F3 | F | 2 | 45/45 | 80 | 69 | 3 | 2 | 13 |
| G1 | G | 3 | 40/40/40 | 80 | 71 | 3 | 2 | 8 |
| H1 | H | 2 | 45/45 | 80 | 71 | 3 | 2 | 10 |
| I1 | I | 2 | 45/45 | 75 | 74 | 3 | 2 | 5 |
| I2 | I | 2 | 45/45 | 75 | 58 | 2 | 2 | 12 |
| I3 | I | 1 | 50 | 120 | 64 | 2 | 2 | 9 |
| I4 | I | 2 | 45/45 | 75 | 64 | 2 | 2 | 5 |
| I5 | I | 2 | 45/45 | 75 | 58 | 2 | 2 | 5 |
| I6 | I | 2 | 45/45 | 75 | 61 | 2 | 2 | 5 |

TABLE 4-continued

| | | Rolling at 1,000° C. to 1,200° C. | | | Rolling at T1 + 30° C. to T1 + 200° C. | | | |
|---|---|---|---|---|---|---|---|---|
| Production No. | Steel No. | Number of times of rolling reduction of 40% or more/— | Rolling reduction ratio of each rolling reduction of 40% or more/% | Austenite grain size/μm | Accumulative rolling reduction ratio/% | Number of times of rolling reduction/% | Number of times of rolling reduction of 30% or more/— | Rise of temperature between respective passes/° C. |
| I7 | I | 2 | 45/45 | 75 | 61 | 2 | 2 | 5 |
| I8 | I | 2 | 45/45 | 75 | 64 | 2 | 2 | 5 |
| I9 | I | 2 | 45/45 | 75 | 61 | 2 | 2 | 5 |

TABLE 5

| Production No. | Rolling reduction ratio before one pass of final pass of large-rolling-reduction pass/% | P1/% | Time taken before initiation of second cooling after completion of first cooling/° C. | Time taken before initiation of second cooling after completion of first cooling/s | Accumulative rolling reduction ratio at a temperature equal to or higher than Ar$_3$° C. and lower than T1 + 30° C./% | Tf/° C. | t1/s | 2.5 × t1/s | t/s | t/t1/— |
|---|---|---|---|---|---|---|---|---|---|---|
| A1 | 35 | 45 | 100 | 1.5 | 0 | 984 | 0.13 | 0.33 | 0.28 | 2.13 |
| A2 | 35 | 40 | 80 | 1.5 | 10 | 934 | 0.87 | 2.18 | 1.15 | 1.32 |
| A3 | 35 | 35 | 60 | 1.0 | 0 | 912 | 1.59 | 3.97 | 1.60 | 1.01 |
| A4 | 35 | 35 | 60 | 1.0 | 0 | 900 | 1.93 | 4.81 | 2.00 | 1.04 |
| A5 | 30 | 30 | 65 | 0.5 | 0 | 892 | 2.29 | 5.73 | 2.15 | 0.94 |
| B1 | 30 | 40 | 120 | 2.0 | 0 | 982 | 0.14 | 0.35 | 0.29 | 2.02 |
| B2 | 40 | 40 | 80 | 1.5 | 0 | 922 | 0.88 | 2.21 | 1.15 | 1.30 |
| B3 | 30 | 30 | 60 | 1.0 | 5 | 889 | 2.08 | 5.19 | 1.02 | 0.49 |
| B4 | 30 | 30 | 60 | 1.5 | 0 | 899 | 1.82 | 4.55 | 0.07 | 0.04 |
| B5 | 40 | 40 | 60 | 1.5 | 0 | 899 | 1.47 | 3.68 | 0.07 | 0.05 |
| C1 | 40 | 40 | 100 | 0.5 | 0 | 966 | 0.37 | 0.92 | 0.37 | 1.01 |
| C2 | 40 | 40 | 30 | 1.5 | 0 | 936 | 0.88 | 2.20 | 1.15 | 1.31 |
| D1 | 29 | 30 | 100 | 1.5 | 0 | 963 | 0.83 | 2.07 | 0.49 | 0.59 |
| D2 | — | 35 | 100 | 1.0 | 0 | 963 | 0.60 | 1.50 | 0.70 | 1.16 |
| E1 | 40 | 45 | 30 | 2.5 | 40 | 909 | 1.22 | 3.04 | 1.47 | 1.21 |
| E2 | 40 | 40 | 60 | 1.0 | 0 | 929 | 0.86 | 2.20 | 1.15 | 1.31 |
| F1 | 30 | 45 | 120 | 1.5 | 15 | 944 | 0.95 | 2.37 | 1.04 | 1.09 |
| F2 | 35 | 40 | 120 | 1.5 | 0 | 954 | 0.88 | 2.21 | 8.00 | 6.78 |
| F3 | 35 | 40 | 100 | 2.0 | 0 | 954 | 0.88 | 2.21 | 2.01 | 2.27 |
| G1 | 40 | 40 | 100 | 1.0 | 0 | 958 | 0.36 | 0.91 | 0.37 | 1.01 |
| H1 | 40 | 40 | 100 | 2.0 | 20 | 959 | 1.10 | 2.75 | 1.21 | 1.10 |
| I1 | 40 | 45 | 100 | 1.0 | 0 | 952 | 0.24 | 0.60 | 0.49 | 2.04 |
| I2 | 30 | 40 | 80 | 1.5 | 0 | 922 | 0.88 | 2.20 | 1.15 | 1.31 |
| I3 | 40 | 40 | 100 | 1.0 | 0 | 911 | 1.14 | 2.84 | 2.00 | 1.76 |
| I4 | 40 | 40 | 100 | 1.0 | 0 | 933 | 0.49 | 1.22 | 0.97 | 1.98 |
| I5 | 40 | 30 | 100 | 1.0 | 0 | 920 | 0.75 | 1.86 | 1.20 | 1.61 |
| I6 | 40 | 35 | 100 | 1.0 | 0 | 960 | 0.13 | 0.34 | 0.29 | 2.16 |
| I7 | 40 | 35 | 100 | 1.0 | 0 | 951 | 0.25 | 0.62 | 0.33 | 1.33 |
| I8 | 40 | 40 | 100 | 1.0 | 0 | 890 | 1.60 | 3.99 | 1.50 | 0.94 |
| I9 | 40 | 35 | 100 | 1.0 | 0 | 920 | 0.75 | 1.86 | 1.41 | 1.89 |

TABLE 6

| | | Rolling at 1,000° C. to 1,200° C. | | | Rolling at T1 + 30° C. to T1 + 200° C. | | | |
|---|---|---|---|---|---|---|---|---|
| Production No. | Steel No. | Number of times of rolling reduction of 40% or more/— | Rolling reduction ratio of each rolling reduction of 40% or more/% | Austenite grain size/μm | Accumulative rolling reduction ratio/% | Number of times of rolling reduction/% | Number of times of rolling reduction of 30% or more/— | Rise of temperature between respective passes/° C. |
| J1 | J | 3 | 40/40/40 | 85 | 65 | 2 | 2 | 12 |
| J2 | J | 2 | 45/45 | 75 | 58 | 2 | 2 | 15 |
| K1 | K | 3 | 40/40/40 | 50 | 68 | 2 | 2 | 14 |
| K2 | K | 3 | 40/40/40 | 50 | 71 | 3 | 2 | 15 |
| L1 | L | 2 | 45/45 | 80 | 67 | 3 | 1 | 18 |
| L2 | L | 2 | 45/45 | 80 | 66 | 3 | 2 | 18 |
| M1 | M | 1 | 50 | 150 | 55 | 2 | 1 | 10 |
| M2 | M | 1 | 50 | 150 | 52 | 2 | 1 | 10 |
| N1 | N | 2 | 45/45 | 75 | 58 | 2 | 1 | 5 |
| N2 | N | 1 | 50 | 130 | 54 | 3 | 2 | 15 |
| N3 | N | 2 | 45/45 | 70 | 72 | 3 | 2 | 25 |
| O1 | O | 2 | 45/45 | 80 | 52 | 2 | 1 | 10 |
| O2 | O | 1 | 40 | 120 | 25 | 1 | 0 | 15 |
| P1 | P | 2 | 45/45 | 75 | 64 | 2 | 2 | 10 |
| Q1 | Q | 2 | 45/45 | 80 | 69 | 3 | 2 | 12 |

TABLE 6-continued

| | | Rolling at 1,000° C. to 1,200° C. | | | Rolling at T1 + 30° C. to T1 + 200° C. | | | |
| --- | --- | --- | --- | --- | --- | --- | --- | --- |
| Production No. | Steel No. | Number of times of rolling reduction of 40% or more/— | Rolling reduction ratio of each rolling reduction of 40% or more/% | Austenite grain size/μm | Accumulative rolling reduction ratio/% | Number of times of rolling reduction/% | Number of times of rolling reduction of 30% or more/— | Rise of temperature between respective passes/ ° C. |
| R1 | R | 2 | 45/45 | 75 | 71 | 3 | 2 | 12 |
| S1 | S | 2 | 45/45 | 80 | 69 | 3 | 2 | 13 |
| S2 | S | 2 | 45/45 | 75 | 64 | 2 | 2 | 8 |
| T1 | T | 2 | 40/40 | 80 | 67 | 2 | 2 | 9 |
| T2 | T | 2 | 45/45 | 85 | 64 | 2 | 2 | 6 |
| U1 | U | 2 | 45/45 | 75 | 67 | 2 | 2 | 5 |
| V1 | V | 2 | 45/45 | 85 | 71 | 3 | 2 | 12 |
| W1 | W | 1 | 50 | 130 | 50 | 1 | 1 | 13 |
| X1 | X | 2 | 40/50 | 80 | 54 | 2 | 2 | 15 |
| X2 | X | 2 | 45/45 | 75 | 63 | 2 | 2 | 16 |
| Y1 | Y | 2 | 45/40 | 70 | 51 | 2 | 2 | 13 |
| Y2 | Y | 2 | 40/40 | 85 | 64 | 2 | 2 | 16 |
| a1 | a | 2 | 45/45 | 75 | 76 | 3 | 2 | 16 |
| b1 | b | 1 | 50 | 120 | 67 | 2 | 2 | 15 |
| c1 | c | 2 | 45/45 | 75 | 67 | 2 | 2 | 18 |
| d1 | d | 2 | 45/45 | 75 | 64 | 2 | 2 | 18 |
| e1 | e | 2 | 45/45 | 80 | 51 | 2 | 1 | 15 |
| f1 | f | 2 | 45/45 | 80 | 61 | 3 | 2 | 12 |
| g1 | g | 2 | 45/45 | 75 | 51 | 2 | 1 | 10 |

TABLE 7

| Production No. | Rolling reduction ratio before one pass of final pass of large-rolling-reduction pass/% | Time taken before initiation of second cooling after completion of first cooling/ ° C. | P1/% | Time taken before initiation of second cooling after completion of first cooling/s | Accumulative rolling reduction ratio at a temperature equal to or higher than Ar₃° C. and lower than T1 + 30° C./% | Tf/ ° C. | t1/s | 2.5 × t1/s | t/s | t/t1/— |
| --- | --- | --- | --- | --- | --- | --- | --- | --- | --- | --- |
| J1 | 30 | 50 | 50 | 1.0 | 0 | 962 | 0.13 | 0.33 | 0.30 | 2.34 |
| J2 | 30 | 40 | 60 | 1.5 | 0 | 922 | 0.88 | 2.20 | 1.46 | 1.66 |
| K1 | 35 | 50 | 100 | 1.5 | 0 | 961 | 0.17 | 0.43 | 0.42 | 2.44 |
| K2 | 35 | 45 | 100 | 1.5 | 0 | 923 | 0.93 | 2.32 | 0.98 | 1.06 |
| L1 | 25 | 45 | 120 | 1.0 | 0 | 953 | 0.25 | 0.62 | 0.37 | 1.49 |
| L2 | 30 | 40 | 100 | 1.0 | 0 | 923 | 0.90 | 2.24 | 0.66 | 0.74 |
| M1 | 25 | 40 | 120 | 1.5 | 10 | 966 | 0.36 | 0.89 | 0.49 | 1.38 |
| M2 | 20 | 40 | 80 | 1.0 | 0 | 966 | 0.36 | 0.89 | 0.25 | 0.70 |
| N1 | 30 | 40 | 80 | 1.0 | 0 | 952 | 0.37 | 0.92 | 0.49 | 1.34 |
| N2 | 30 | 30 | 70 | 1.5 | 25 | 930 | 1.14 | 2.84 | 2.01 | 1.77 |
| N3 | 40 | 40 | 90 | 2.5 | 10 | 899 | 1.46 | 3.66 | 1.33 | 0.91 |
| O1 | 20 | 40 | 100 | 1.0 | 0 | 985 | 0.38 | 0.96 | 0.37 | 0.97 |
| O2 | — | 25 | 100 | 1.5 | 10 | 955 | 1.57 | 3.91 | 1.15 | 0.74 |
| P1 | 45 | 35 | 20 | 1.0 | 0 | 973 | 0.58 | 1.44 | 0.49 | 0.85 |
| Q1 | 35 | 40 | 100 | 1.0 | 0 | 952 | 0.36 | 0.91 | 0.37 | 1.02 |
| R1 | 40 | 40 | 100 | 1.0 | 0 | 985 | 0.26 | 0.64 | 0.39 | 1.52 |
| S1 | 35 | 40 | 80 | 1.0 | 0 | 992 | 0.13 | 0.33 | 0.28 | 2.16 |
| S2 | 40 | 40 | 80 | 1.5 | 0 | 922 | 0.87 | 2.18 | 0.81 | 0.93 |
| T1 | 45 | 40 | 100 | 1.0 | 15 | 961 | 0.39 | 0.96 | 0.37 | 0.96 |
| T2 | 40 | 40 | 100 | 1.5 | 0 | 931 | 0.91 | 2.28 | 0.98 | 1.07 |
| U1 | 45 | 40 | 80 | 1.0 | 10 | 976 | 0.36 | 0.89 | 0.49 | 1.38 |
| V1 | 40 | 40 | 80 | 1.5 | 0 | 953 | 0.39 | 0.96 | 0.49 | 1.27 |
| W1 | — | 50 | 80 | 2.0 | 10 | 1051 | 0.13 | 0.33 | 0.32 | 2.44 |
| X1 | 30 | 30 | 50 | 2.0 | 5 | 961 | 0.59 | 1.47 | 0.31 | 0.53 |
| X2 | 30 | 40 | 120 | 1.5 | 10 | 890 | 1.63 | 4.08 | 2.00 | 1.23 |
| Y1 | 30 | 30 | 80 | 2.0 | 25 | 920 | 1.71 | 4.28 | 2.10 | 1.23 |
| Y2 | 40 | 40 | 40 | 1.5 | 10 | 883 | 2.60 | 6.50 | 0.26 | 0.10 |
| a1 | 45 | 45 | 100 | 1.0 | 0 | 960 | 0.25 | 0.64 | 0.37 | 1.45 |
| b1 | 40 | 45 | 100 | 1.0 | 0 | 954 | 0.26 | 0.65 | 0.49 | 1.88 |
| c1 | 40 | 45 | 100 | 1.5 | 0 | 994 | 0.51 | 1.26 | 0.79 | 1.56 |
| d1 | 40 | 40 | 100 | 2.0 | 0 | 999 | 1.12 | 2.79 | 1.21 | 1.08 |
| e1 | 25 | 35 | 100 | 1.0 | 0 | 951 | 0.53 | 1.31 | 0.49 | 0.93 |
| f1 | 30 | 30 | 100 | 2.0 | 0 | 1012 | 1.75 | 4.37 | 1.21 | 0.69 |
| g1 | 25 | 35 | 100 | 1.5 | 0 | 953 | 0.55 | 1.37 | 0.49 | 0.89 |

TABLE 8

| Production No. | Winding temperature/ °C. | Cold rolling reduction ratio/% | HR1/ °C./s | HR2/ °C./s | $A_{c1}$/ °C. | Annealing temperature/ °C. | Retention time during annealing/s |
|---|---|---|---|---|---|---|---|
| A1 | 500 | 45 | 2.0 | 0.9 | 742 | 790 | 60 |
| A2 | 500 | 45 | 1.5 | 0.7 | 742 | <u>660</u> | 60 |
| A3 | 550 | 55 | 2.0 | 0.8 | 742 | 830 | 60 |
| A4 | 500 | 65 | 2.5 | 1.2 | 742 | 820 | 50 |
| A5 | 550 | 58 | 0.9 | 0.7 | 742 | 800 | 90 |
| B1 | 500 | 45 | 2.5 | 1.0 | 737 | 850 | 30 |
| B2 | 500 | 45 | 2.7 | 1.1 | 737 | 850 | 90 |
| B3 | 400 | 35 | 1.3 | 0.5 | 737 | 800 | 50 |
| B4 | 450 | 45 | 1.1 | 0.5 | 737 | 830 | 100 |
| B5 | 500 | <u>92</u> | 2.2 | 1.0 | 737 | 850 | 100 |
| C1 | 600 | 50 | 2.5 | 1.0 | 735 | 800 | 30 |
| C2 | 600 | 50 | 3.0 | 1.2 | 735 | 800 | 30 |
| D1 | 600 | 40 | 2.1 | 1.0 | 754 | 820 | 40 |
| D2 | 600 | 40 | 2.1 | 0.8 | 754 | 820 | 40 |
| E1 | 600 | 50 | 1.8 | 0.6 | 730 | 750 | 40 |
| E2 | 600 | 50 | 1.6 | 0.7 | 730 | 750 | 40 |
| F1 | 500 | 40 | 2.3 | 1.1 | 721 | 830 | 90 |
| F2 | 500 | 40 | 1.5 | 0.6 | 721 | 830 | 90 |
| F3 | <u>680</u> | 40 | 2.1 | 1.0 | 721 | 820 | 60 |
| G1 | 600 | 55 | 2.0 | 1.0 | 733 | 760 | 30 |
| H1 | 500 | 45 | 2.0 | 0.8 | 716 | 850 | 90 |
| I1 | 600 | 50 | 1.5 | 0.7 | 757 | 780 | 30 |
| I2 | 600 | 50 | 1.7 | 0.8 | 757 | 780 | 90 |
| I3 | 600 | 55 | 0.2 | 0.4 | 757 | 780 | 30 |
| I4 | 600 | 45 | 2.5 | 1.2 | 757 | <u>950</u> | 30 |
| I5 | 600 | 50 | 1.4 | 0.5 | 757 | 820 | <u>400</u> |
| I6 | 600 | 53 | 1.5 | 0.6 | 757 | 800 | <u>0.5</u> |
| I7 | 600 | 58 | 1.3 | 0.6 | 757 | 850 | 40 |
| I8 | 600 | 60 | 1.4 | 0.7 | 757 | 850 | 10 |
| I9 | 600 | 50 | 0.8 | 0.4 | 757 | 780 | 60 |

TABLE 9

| | Third cooling | | Fourth cooling | | Fifth cooling | | | | |
|---|---|---|---|---|---|---|---|---|---|
| Production No. | Average cooling rate/ °C./s | Cooling termination temperature/ °C. | Average cooling rate/ °C./s | Cooling termination temperature/ °C. | Average cooling rate/ °C./s | Cooling termination temperature/ °C. | $T_{CA}$/ °C. | $t_{CA}$/s | Retention time/s |
| A1 | 3 | 650 | 10 | 360 | — | — | 360 | 106 | 350 |
| A2 | 2 | 610 | 10 | 350 | — | — | 350 | 202 | 250 |
| A3 | 2 | 700 | 30 | 380 | — | — | 360 | 38 | <u>19</u> |
| A4 | 2.5 | 650 | 30 | <u>330</u> | — | — | <u>330</u> | 966 | <u>250</u> |
| A5 | 10 | 650 | 12 | 400 | — | — | 400 | 20 | 200 |
| B1 | 5 | 740 | 20 | 350 | — | — | 350 | 202 | 350 |
| B2 | 3 | 650 | 60 | 350 | — | — | 350 | 202 | 350 |
| B3 | 1.5 | 750 | 80 | — | 60 | 200 | 400 | 20 | 150 |
| B4 | 2 | 680 | 110 | — | 80 | 150 | 350 | 202 | 250 |
| B5 | 2 | 650 | 50 | 430 | — | — | 430 | 15 | 200 |
| C1 | 3 | 730 | 70 | 430 | — | — | 430 | 15 | 350 |
| C2 | 3 | 730 | 60 | 430 | — | — | 430 | 15 | 350 |
| D1 | 2 | 750 | 50 | 370 | — | — | 370 | 61 | 400 |
| D2 | 1.5 | 780 | 10 | 370 | — | — | 370 | 61 | 400 |
| E1 | 2 | 700 | 60 | 430 | — | — | 430 | 15 | 350 |
| E2 | 6 | 580 | 10 | 430 | — | — | 430 | 15 | 300 |
| F1 | 1.5 | 730 | 60 | 380 | — | — | 380 | 38 | 250 |
| F2 | 2 | 700 | 50 | 380 | — | — | 360 | 38 | 250 |
| F3 | 3 | 650 | 40 | 440 | — | — | 440 | 17 | 100 |
| G1 | 7 | 600 | 10 | 410 | — | — | 410 | 17 | 100 |
| H1 | 2 | 710 | 70 | 400 | — | — | 400 | 20 | 375 |
| I1 | 4 | 700 | 50 | 480 | — | — | 480 | 61 | 150 |
| I2 | 2 | 650 | 10 | <u>560</u> | — | — | <u>560</u> | — | 350 |
| I3 | 4 | 650 | 50 | 420 | — | — | 420 | 15 | 100 |
| I4 | 2 | 650 | 50 | 400 | — | — | 400 | 20 | 250 |
| I5 | 2 | 700 | 50 | 430 | — | — | 430 | 15 | 200 |
| I6 | 3 | 680 | 50 | 420 | — | — | 420 | 15 | 150 |
| I7 | <u>0.5</u> | 780 | 50 | 380 | — | — | 380 | 38 | 100 |
| I8 | 1 | <u>810</u> | 50 | 420 | — | — | 420 | 15 | 30 |
| I9 | 2 | 700 | <u>2</u> | 450 | — | — | 450 | 20 | 100 |

TABLE 10

| Production No. | Winding temperature/ °C. | Cold rolling reduction ratio/% | HR1/ °C./s | HR2/ °C./s | $A_{c1}$/ °C. | Annealing temperature/ °C. | Retention time during annealing/s |
|---|---|---|---|---|---|---|---|
| J1 | 600 | 50 | 1.5 | 0.6 | 757 | 780 | 30 |
| J2 | 600 | 50 | 1.3 | 0.6 | 757 | 780 | 90 |
| K1 | 550 | 40 | 1.9 | 0.9 | 725 | 855 | 30 |
| K2 | 600 | 45 | 1.8 | 0.6 | 725 | 800 | 90 |
| L1 | 600 | 45 | 2.0 | 1.0 | 763 | 800 | 30 |
| L2 | 600 | 45 | 2.3 | 1.0 | 763 | 800 | 30 |
| M1 | 500 | 50 | 2.1 | 1.0 | 726 | 840 | 60 |
| M2 | 500 | 20 | 1.6 | 0.7 | 726 | 840 | 60 |
| N1 | 550 | 40 | 1.1 | 0.5 | 730 | 870 | 100 |
| N2 | 500 | 50 | 1.5 | 0.7 | 730 | 800 | 20 |
| N3 | 550 | 50 | 1.2 | 0.5 | 730 | 780 | 60 |
| O1 | 600 | 40 | 1.2 | 0.6 | 743 | 800 | 30 |
| O2 | 600 | 40 | 1.2 | 0.5 | 743 | 800 | 30 |
| P1 | 600 | 40 | 1.3 | 0.4 | 726 | 800 | 40 |
| Q1 | 600 | 50 | 1.5 | 0.5 | 743 | 810 | 40 |
| R1 | 600 | 40 | 1.7 | 0.8 | 757 | 830 | 90 |
| S1 | 550 | 55 | 1.0 | 0.4 | 730 | 780 | 60 |
| S2 | 550 | 45 | 0.6 | 0.2 | 730 | 780 | 60 |
| T1 | 600 | 50 | 3.0 | 1.4 | 710 | 900 | 200 |
| T2 | 500 | 50 | 2.5 | 1.2 | 710 | 870 | 20 |
| U1 | 500 | 45 | 2.1 | 1.0 | 737 | 850 | 30 |
| V1 | 600 | 50 | 2.0 | 1.0 | 734 | 860 | 40 |
| W1 | 550 | 40 | 1.8 | 0.6 | 727 | 800 | 40 |
| X1 | 500 | 60 | 1.6 | 0.7 | 750 | 780 | 50 |
| X2 | 500 | 60 | 1.6 | 0.7 | 750 | 820 | 50 |
| Y1 | 450 | 60 | 2.0 | 1.0 | 793 | 850 | 60 |
| Y2 | 550 | 60 | 1.4 | 0.6 | 793 | 830 | 60 |
| a1 | 600 | 45 | 1.3 | 0.5 | 730 | 820 | 30 |
| b1 | 600 | 45 | 1.0 | 0.4 | 704 | 820 | 30 |
| c1 | 600 | 45 | 1.3 | 0.6 | 739 | 820 | 30 |
| d1 | 600 | 45 | 1.2 | 0.4 | 726 | 820 | 30 |
| e1 | 600 | 50 | 1.3 | 0.5 | 742 | 820 | 30 |
| f1 | 600 | 40 | 1.1 | 0.5 | 731 | 820 | 30 |
| g1 | 600 | 55 | 1.6 | 0.7 | 731 | 820 | 30 |

TABLE 11

| | Third cooling | | Fourth cooling | | Fifth cooling | | | | |
|---|---|---|---|---|---|---|---|---|---|
| Production No. | Average cooling rate/ °C./s | Cooling termination temperature/ °C. | Average cooling rate/ °C./s | Cooling termination temperature/ °C. | Average cooling rate/ °C./s | Cooling termination temperature/ °C. | $T_{OA}$/ °C. | $t_{OA}$/s | Retention time/s |
| J1 | 2 | 730 | 10 | 490 | — | — | 490 | 106 | 200 |
| J2 | 1 | 710 | 40 | 490 | — | — | 490 | 106 | 250 |
| K1 | 4 | 760 | 10 | 350 | — | — | 350 | 202 | 350 |
| K2 | 2.5 | 630 | 10 | 480 | — | — | 480 | 61 | 300 |
| L1 | 4 | 710 | 10 | 480 | — | — | 480 | 61 | 300 |
| L2 | 4 | 710 | 40 | 480 | — | — | 480 | 61 | 400 |
| M1 | 2.5 | 720 | 60 | 380 | — | — | 380 | 38 | 250 |
| M2 | 3 | 710 | 50 | 380 | — | — | 380 | 38 | 300 |
| N1 | 2 | 720 | 70 | 405 | — | — | 405 | 18 | 250 |
| N2 | 23 | 570 | 20 | 400 | — | — | 400 | 20 | 50 |
| N3 | 3 | 680 | 40 | 390 | — | — | 390 | 27 | 150 |
| O1 | 4 | 710 | 50 | 350 | — | — | 350 | 202 | 250 |
| O2 | 4 | 710 | 60 | 350 | — | — | 350 | 202 | 150 |
| P1 | 2 | 740 | 15 | 300 | — | — | 300 | — | 350 |
| Q1 | 4 | 700 | 60 | 430 | — | — | 430 | 15 | 350 |
| R1 | 2 | 690 | 50 | 430 | — | — | 430 | 15 | 350 |
| S1 | 2 | 680 | 10 | 400 | — | — | 400 | 20 | 400 |
| S2 | 2.5 | 670 | 40 | 400 | — | — | 400 | 20 | 400 |
| T1 | 1 | 750 | 50 | 430 | — | — | 430 | 15 | 400 |
| T2 | 15 | 670 | 30 | 430 | — | — | 430 | 15 | 400 |
| U1 | 6 | 710 | 70 | 430 | — | — | 430 | 15 | 400 |
| V1 | 5 | 690 | 60 | 400 | — | — | 400 | 20 | 400 |
| W1 | 4 | 680 | 60 | 430 | — | — | 430 | 15 | 400 |
| X1 | 3.5 | 650 | 20 | — | 20 | 300 | 380 | 38 | 200 |
| X2 | 3 | 700 | 40 | 380 | — | — | 380 | 38 | 150 |
| Y1 | 5 | 600 | 20 | 410 | — | — | 410 | 17 | 150 |
| Y2 | 4 | 650 | 40 | — | 40 | 250 | 420 | 15 | 40 |
| a1 | 5 | 710 | 60 | 430 | — | — | 430 | 15 | 350 |
| b1 | 4 | 730 | 50 | 430 | — | — | 430 | 15 | 350 |
| c1 | 6 | 690 | 50 | 430 | — | — | 430 | 15 | 350 |
| d1 | 4 | 700 | 40 | 430 | — | — | 430 | 15 | 350 |

TABLE 11-continued

| | Third cooling | | Fourth cooling | | Fifth cooling | | | | |
|---|---|---|---|---|---|---|---|---|---|
| Production No. | Average cooling rate/ °C./s | Cooling termination temperature/ °C. | Average cooling rate/ °C./s | Cooling termination temperature/ °C. | Average cooling rate/ °C./s | Cooling termination temperature/ °C. | $T_{OA}$/ °C. | $t_{OA}$/s | Retention time/s |
| e1 | 5 | 700 | 40 | 430 | — | — | 430 | 15 | 350 |
| f1 | 5 | 710 | 50 | 430 | — | — | 430 | 15 | 350 |
| g1 | 4 | 720 | 30 | 430 | — | — | 430 | 15 | 350 |

TABLE 12

| Production No. | D1/— | D2/— | F/% | B/% | Residual γ/% | M/% | P/% | t-M/% | $HV_d$/ | Cγ/% | rL/— | rC/— |
|---|---|---|---|---|---|---|---|---|---|---|---|---|
| A1 | 2.6 | 2.5 | 31 | 48 | 11 | 4 | 6 | 0 | 309 | 1.1 | 0.83 | 0.84 |
| A2 | 6.6 | 3.0 | 81 | 9 | 3 | 5 | 2 | 0 | 238 | 0.6 | 0.80 | 0.81 |
| A3 | 2.3 | 1.9 | 36 | 3 | 4 | 53 | 4 | 0 | 249 | 0.7 | 0.88 | 0.89 |
| A4 | 2.9 | 2.3 | 35 | 4 | 3 | 55 | 3 | 0 | 255 | 0.6 | 0.91 | 0.98 |
| A5 | 6.9 | 5.2 | 59 | 19 | 4 | 10 | 8 | 0 | 255 | 0.6 | 1.19 | 1.13 |
| B1 | 2.1 | 2.6 | 25 | 45 | 13 | 7 | 10 | 0 | 311 | 1.2 | 0.84 | 0.85 |
| B2 | 2.2 | 3.0 | 22 | 46 | 12 | 10 | 10 | 0 | 278 | 1.1 | 0.79 | 0.81 |
| B3 | 1.5 | 2.4 | 30 | 11 | 15 | 2 | 2 | 40 | 244 | 1.3 | 0.91 | 0.89 |
| B4 | 1.9 | 2.7 | 17 | 10 | 10 | 3 | 3 | 57 | 271 | 1.3 | 1.01 | 0.99 |
| B5 | 8.7 | 5.9 | 32 | 48 | 12 | 7 | 1 | 0 | 258 | 1.3 | 1.21 | 1.19 |
| C1 | 3.0 | 2.5 | 37 | 42 | 16 | 0 | 5 | 0 | 250 | 1.3 | 0.78 | 0.80 |
| C2 | 6.6 | 3.5 | 30 | 41 | 5 | 19 | 3 | 2 | 244 | 1.6 | 0.40 | 0.40 |
| D1 | 3.1 | 3.8 | 22 | 51 | 6 | 17 | 4 | 0 | 291 | 1.1 | 0.83 | 0.84 |
| D2 | 6.6 | 5.8 | 20 | 65 | 3 | 1 | 10 | 1 | 303 | 0.7 | 0.84 | 0.85 |
| E1 | 6.7 | 7.1 | 29 | 55 | 12 | 0 | 4 | 0 | 240 | 1.4 | 0.73 | 0.75 |
| E2 | 3.6 | 2.5 | 60 | 13 | 17 | 5 | 5 | 0 | 261 | 1.7 | 0.79 | 0.81 |
| F1 | 3.2 | 4.0 | 20 | 55 | 9 | 6 | 10 | 0 | 249 | 1.3 | 0.72 | 0.75 |
| F2 | 1.1 | 1.2 | 24 | 57 | 10 | 9 | 0 | 0 | 244 | 0.8 | 1.17 | 1.11 |
| F3 | 6.6 | 4.6 | 33 | 48 | 10 | 9 | 0 | 0 | 261 | 0.8 | 0.93 | 0.89 |
| G1 | 3.4 | 2.0 | 49 | 33 | 16 | 2 | 0 | 0 | 263 | 1.3 | 0.78 | 0.80 |
| H1 | 3.1 | 3.6 | 25 | 43 | 11 | 11 | 10 | 0 | 221 | 1.3 | 0.72 | 0.76 |
| I1 | 3.8 | 2.8 | 30 | 33 | 17 | 16 | 4 | 0 | 211 | 1.6 | 0.74 | 0.77 |
| I2 | 3.2 | 2.5 | 36 | 12 | 1 | 29 | 22 | 0 | 144 | 0.8 | 0.78 | 0.80 |
| I3 | 6.8 | 5.1 | 42 | 33 | 12 | 13 | 0 | 0 | 241 | 1.2 | 1.22 | 1.19 |
| I4 | 2.6 | 2.1 | 5 | 79 | 12 | 4 | 0 | 0 | 250 | 1.6 | 1.19 | 1.11 |
| I5 | 3.0 | 2.5 | 30 | 33 | 17 | 16 | 4 | 0 | 238 | 1.6 | 1.12 | 1.11 |
| I6 | 2.2 | 1.8 | 87 | 4 | 3 | 4 | 2 | 0 | 244 | 1.6 | 0.91 | 0.88 |
| I7 | 2.8 | 2.6 | 4 | 81 | 11 | 1 | 3 | 0 | 271 | 1.6 | 0.87 | 0.87 |
| I8 | 2.4 | 2.3 | 3 | 85 | 9 | 3 | 0 | 0 | 243 | 1.6 | 0.82 | 0.91 |
| I9 | 3.5 | 2.8 | 41 | 11 | 1 | 16 | 31 | 0 | 251 | 1.6 | 0.93 | 0.90 |

TABLE 13

| Production No. | r30/— | r60/— | Area ratio of coarse grain/% | Volume average diameter/ μm | Equiaxed grain fraction/% | TS/ MPa | EL/% | λ/% | TS × EL/ MPa % | TS × λ/ MPa % | Remarks |
|---|---|---|---|---|---|---|---|---|---|---|---|
| A1 | 0.85 | 0.88 | 2.5 | 3.3 | 29 | 785 | 24 | 72 | 19000 | 56888 | Example |
| A2 | 0.90 | 0.92 | 10.5 | 11.2 | 73 | 320 | 34 | 91 | 10880 | 29234 | Comparative Example |
| A3 | 0.83 | 0.81 | 9.2 | 10.0 | 60 | 1115 | 9 | 24 | 10035 | 27119 | Comparative Example |
| A4 | 0.85 | 0.84 | 8.9 | 6.9 | 65 | 1199 | 8 | 22 | 9592 | 26077 | Comparative Example |
| A5 | 0.69 | 0.71 | 9.8 | 8.1 | 41 | 591 | 27 | 41 | 15957 | 24231 | Comparative Example |
| B1 | 0.86 | 0.89 | 2.6 | 3.4 | 29 | 788 | 24 | 78 | 19000 | 61512 | Example |
| B2 | 0.90 | 0.92 | 10.5 | 11.2 | 73 | 778 | 24 | 75 | 19000 | 58459 | Example |
| B3 | 0.85 | 0.86 | 9.3 | 10.0 | 66 | 1091 | 21 | 53 | 22911 | 57823 | Example |
| B4 | 0.91 | 0.88 | 0.6 | 3.1 | 19 | 1233 | 17 | 49 | 20961 | 60417 | Example |
| B5 | 0.85 | 0.79 | 0.6 | 2.8 | 7 | 955 | 16 | 19 | 15280 | 18145 | Comparative Example |
| C1 | 0.91 | 0.93 | 3.4 | 4.1 | 34 | 598 | 28 | 92 | 17000 | 55089 | Example |
| C2 | 1.26 | 1.15 | 10.5 | 11.2 | 73 | 598 | 22 | 48 | 13412 | 26919 | Comparative Example |
| D1 | 0.99 | 0.99 | 4.5 | 5.2 | 40 | 1216 | 14 | 30 | 17000 | 36221 | Example |
| D2 | 0.95 | 0.96 | 6.4 | 7.1 | 50 | 1211 | 8 | 6 | 9732 | 7268 | Comparative Example |
| E1 | 1.01 | 1.01 | 13.4 | 14.0 | 89 | 585 | 29 | 38 | 17000 | 22321 | Comparative Example |
| E2 | 0.90 | 0.92 | 10.5 | 11.2 | 73 | 588 | 29 | 90 | 17000 | 53121 | Example |
| F1 | 0.97 | 0.98 | 9.4 | 10.1 | 67 | 1198 | 14 | 40 | 17000 | 47420 | Example |
| F2 | 0.89 | 0.91 | 41.0 | 16.1 | 91 | 1100 | 15 | 27 | 16500 | 29714 | Comparative Example |
| F3 | 0.66 | 0.69 | 13.0 | 5.8 | 79 | 1001 | 13 | 15 | 13013 | 15015 | Comparative Example |
| G1 | 0.91 | 0.93 | 3.4 | 4.1 | 34 | 594 | 29 | 90 | 17000 | 53627 | Example |
| H1 | 0.97 | 0.98 | 11.0 | 11.7 | 76 | 844 | 20 | 62 | 17000 | 52621 | Example |
| I1 | 0.94 | 0.95 | 4.5 | 5.2 | 40 | 593 | 37 | 90 | 22000 | 53464 | Example |
| I2 | 0.90 | 0.92 | 10.5 | 11.2 | 73 | 583 | 38 | 29 | 22000 | 16912 | Comparative Example |

TABLE 13-continued

| Production No. | r30/— | r60/— | Area ratio of coarse grain/% | Volume average diameter/μm | Equiaxed grain fraction/% | TS/MPa | EL/% | λ/% | TS × EL/MPa % | TS × λ/MPa % | Remarks |
|---|---|---|---|---|---|---|---|---|---|---|---|
| I3 | 0.99 | 0.91 | 4.5 | 7.4 | 40 | 709 | 18 | 31 | 12762 | 21979 | Comparative Example |
| I4 | 0.94 | 0.95 | 38.0 | 16.4 | 31 | 889 | 14 | 22 | 12446 | 19558 | Comparative Example |
| I5 | 0.90 | 0.92 | 30.3 | 15.3 | 33 | 711 | 19 | 23 | 13509 | 16353 | Comparative Example |
| I6 | 0.81 | 0.81 | 10.1 | 7.3 | 55 | 288 | 36 | 71 | 10368 | 20448 | Comparative Example |
| I7 | 0.83 | 0.88 | 8.1 | 6.3 | 58 | 1081 | 11 | 34 | 11891 | 36754 | Comparative Example |
| I8 | 0.83 | 0.84 | 2.1 | 4.1 | 63 | 1121 | 9 | 39 | 10089 | 43719 | Comparative Example |
| I9 | 0.83 | 0.88 | 7.3 | 7.4 | 73 | 661 | 13 | 31 | 8593 | 20491 | Comparative Example |

TABLE 14

| Production No. | D1/— | D2/— | F/% | B/% | Residual γ/% | M/% | P/% | t-M/% | $HV_d$/— | Cγ/% | rL/— | rC/— |
|---|---|---|---|---|---|---|---|---|---|---|---|---|
| J1 | 2.9 | 2.2 | 34 | 29 | 14 | 19 | 4 | 0 | 188 | 1.5 | 0.82 | 0.83 |
| J2 | 3.2 | 2.5 | 34 | 41 | 5 | 15 | 5 | 0 | 200 | 1.0 | 0.78 | 0.80 |
| K1 | 2.7 | 3.8 | 24 | 51 | 9 | 11 | 5 | 0 | 290 | 1.0 | 0.76 | 0.79 |
| K2 | 3.5 | 3.5 | 35 | 40 | 10 | 12 | 3 | 0 | 212 | 1.3 | 0.73 | 0.76 |
| L1 | 3.0 | 3.0 | 30 | 47 | 11 | 4 | 8 | 0 | 180 | 1.6 | 0.78 | 0.80 |
| L2 | 3.4 | 3.4 | 32 | 39 | 14 | 6 | 9 | 0 | 192 | 1.5 | 0.74 | 0.77 |
| M1 | 2.9 | 2.8 | 26 | 38 | 22 | 4 | 10 | 0 | 267 | 1.5 | 0.89 | 0.89 |
| M2 | 6.9 | 5.3 | 26 | 42 | 16 | 7 | 9 | 0 | 240 | 1.4 | 0.93 | 0.92 |
| N1 | 2.6 | 3.8 | 11 | 68 | 18 | 1 | 2 | 0 | 229 | 1.8 | 0.74 | 0.77 |
| N2 | 2.2 | 1.9 | 37 | 24 | 4 | 6 | 29 | 0 | 260 | 0.8 | 0.88 | 0.87 |
| N3 | 3.1 | 2.9 | 41 | 34 | 11 | 6 | 8 | 0 | 266 | 1.1 | 1.09 | 1.05 |
| O1 | 3.0 | 3.5 | 30 | 48 | 9 | 9 | 4 | 0 | 325 | 1.3 | 0.78 | 0.80 |
| O2 | 6.7 | 5.5 | 44 | 4 | 7 | 43 | 2 | 0 | 340 | 1.1 | 0.58 | 0.58 |
| P1 | 3.3 | 3.8 | 11 | 6 | 1 | 11 | 7 | 64 | 330 | 0.5 | 0.74 | 0.77 |
| Q1 | 2.9 | 2.5 | 31 | 46 | 17 | 2 | 4 | 0 | 266 | 1.6 | 0.78 | 0.80 |
| R1 | 2.8 | 3.6 | 27 | 40 | 9 | 16 | 8 | 0 | 239 | 1.2 | 0.76 | 0.79 |
| S1 | 2.8 | 2.6 | 33 | 33 | 21 | 4 | 9 | 0 | 236 | 2.1 | 0.83 | 0.84 |
| S2 | 3.7 | 3.5 | 40 | 39 | 17 | 0 | 4 | 0 | 250 | 1.6 | 0.72 | 0.76 |
| T1 | 2.3 | 2.5 | 7 | 73 | 13 | 1 | 6 | 0 | 251 | 1.5 | 0.78 | 0.80 |
| T2 | 2.8 | 3.0 | 10 | 62 | 21 | 0 | 7 | 0 | 240 | 1.9 | 0.73 | 0.76 |
| U1 | 2.8 | 3.3 | 21 | 63 | 12 | 2 | 2 | 0 | 244 | 1.3 | 0.74 | 0.77 |
| V1 | 2.7 | 2.8 | 15 | 59 | 15 | 4 | 7 | 0 | 231 | 1.6 | 0.76 | 0.79 |
| W1 | 3.6 | 3.2 | 23 | 51 | 5 | 20 | 1 | 0 | 262 | 1.0 | 0.79 | 0.81 |
| X1 | 4.0 | 4.0 | 41 | 21 | 15 | 0 | 4 | 19 | 253 | 1.3 | 0.88 | 0.85 |
| X2 | 2.1 | 2.3 | 25 | 55 | 14 | 2 | 4 | 0 | 249 | 1.1 | 0.89 | 0.91 |
| Y1 | 1.8 | 1.4 | 35 | 41 | 9 | 10 | 5 | 0 | 253 | 1.1 | 0.87 | 0.87 |
| Y2 | 5.1 | 4.5 | 37 | 10 | 13 | 3 | 2 | 35 | 241 | 1.2 | 0.97 | 0.99 |
| a1 | 2.8 | 3.0 | 22 | 51 | 5 | 21 | 1 | 0 | 249 | 0.7 | 0.77 | 0.79 |
| b1 | 4.0 | 3.9 | 22 | 42 | 12 | 23 | 1 | 0 | 244 | 0.7 | 0.53 | 0.64 |
| c1 | 8.3 | 9.5 | 30 | 51 | 9 | 4 | 6 | 0 | 261 | 1.3 | 0.42 | 0.56 |
| d1 | 8.4 | 9.6 | 27 | 48 | 8 | 8 | 9 | 0 | 283 | 1.1 | 0.41 | 0.55 |
| e1 | 3.1 | 2.8 | 30 | 41 | 7 | 21 | 1 | 0 | 240 | 1.2 | 0.75 | 0.78 |
| f1 | 6.6 | 8.1 | 27 | 41 | 6 | 22 | 4 | 0 | 261 | 1.1 | 0.42 | 0.56 |
| g1 | 3.1 | 2.3 | 24 | 48 | 13 | 7 | 8 | 0 | 250 | 1.5 | 0.74 | 0.77 |

TABLE 15

| Production No. | r30/— | r60/— | Area ratio of coarse grain/% | Volume average diameter/μm | Equiaxed grain fraction/% | TS/MPa | EL/% | λ/% | TS × EL/MPa % | TS × λ/MPa % | Remarks |
|---|---|---|---|---|---|---|---|---|---|---|---|
| J1 | 0.88 | 0.91 | 2.8 | 3.5 | 30 | 608 | 36 | 92 | 22000 | 55638 | Example |
| J2 | 0.90 | 0.92 | 13.2 | 13.9 | 88 | 603 | 36 | 91 | 22000 | 54683 | Example |
| K1 | 0.95 | 0.96 | 4.5 | 5.2 | 40 | 1194 | 16 | 29 | 19000 | 35112 | Example |
| K2 | 0.99 | 0.99 | 8.9 | 9.6 | 64 | 1194 | 16 | 28 | 19000 | 33412 | Example |
| L1 | 0.91 | 0.93 | 3.4 | 4.1 | 34 | 795 | 28 | 68 | 22000 | 54439 | Example |
| L2 | 0.95 | 0.96 | 6.0 | 6.7 | 48 | 785 | 28 | 67 | 22000 | 52920 | Example |
| M1 | 1.00 | 1.00 | 4.5 | 5.2 | 40 | 592 | 28 | 94 | 17000 | 55626 | Example |
| M2 | 0.96 | 0.97 | 17.1 | 13.4 | 17 | 592 | 22 | 49 | 13032 | 29027 | Comparative Example |
| N1 | 0.92 | 0.94 | 4.5 | 5.2 | 40 | 974 | 17 | 51 | 17000 | 49242 | Example |
| N2 | 0.81 | 0.79 | 5.9 | 7.4 | 41 | 901 | 14 | 33 | 12614 | 29335 | Comparative Example |
| N3 | 0.79 | 0.81 | 15.0 | 13.0 | 51 | 811 | 19 | 39 | 15409 | 31629 | Example |
| O1 | 0.89 | 0.91 | 3.4 | 4.1 | 34 | 874 | 19 | 59 | 17000 | 51554 | Example |
| O2 | 1.18 | 1.31 | 10.5 | 11.2 | 73 | 884 | 14 | 13 | 13996 | 12389 | Comparative Example |
| P1 | 0.94 | 0.95 | 4.5 | 5.2 | 40 | 1483 | 6 | 33 | 8899 | 49554 | Comparative Example |
| Q1 | 0.91 | 0.93 | 3.4 | 4.1 | 34 | 600 | 32 | 93 | 19000 | 55527 | Example |
| R1 | 0.92 | 0.93 | 3.5 | 4.3 | 35 | 1110 | 15 | 43 | 17000 | 47316 | Example |
| S1 | 0.86 | 0.89 | 2.6 | 3.3 | 29 | 594 | 32 | 94 | 19000 | 56102 | Example |

TABLE 15-continued

| Production No. | r30/— | r60/— | Area ratio of coarse grain/% | Volume average diameter/μm | Equiaxed grain fraction/% | TS/MPa | EL/% | λ/% | TS × EL/MPa % | TS × λ/MPa % | Remarks |
|---|---|---|---|---|---|---|---|---|---|---|---|
| S2 | 0.96 | 0.96 | 7.4 | 8.1 | 55 | 590 | 32 | 89 | 19000 | 52836 | Example |
| T1 | 0.92 | 0.94 | 3.4 | 4.1 | 34 | 1004 | 19 | 49 | 19000 | 49585 | Example |
| T2 | 0.98 | 0.98 | 8.9 | 9.6 | 64 | 989 | 19 | 47 | 19000 | 46071 | Example |
| U1 | 0.94 | 0.95 | 4.5 | 5.2 | 40 | 665 | 26 | 86 | 17000 | 57158 | Example |
| V1 | 0.94 | 0.95 | 4.5 | 5.2 | 40 | 756 | 22 | 76 | 17000 | 57346 | Example |
| W1 | 1.05 | 1.04 | 14.7 | 11.6 | 98 | 1459 | 12 | 32 | 17000 | 46227 | Example |
| X1 | 0.71 | 0.70 | 2.8 | 3.6 | 31 | 901 | 27 | 53 | 24327 | 47753 | Example |
| X2 | 0.85 | 0.83 | 18.2 | 12.2 | 95 | 1021 | 24 | 57 | 24504 | 58197 | Example |
| Y1 | 0.83 | 0.84 | 16.9 | 13.4 | 91 | 1051 | 24 | 58 | 25224 | 60958 | Example |
| Y2 | 0.85 | 0.81 | 3.0 | 3.5 | 38 | 1190 | 18 | 34 | 21420 | 40460 | Example |
| a1 | 0.96 | 0.97 | 4.0 | 11.2 | 38 | 893 | 14 | 13 | 12537 | 11496 | Comparative Example |
| b1 | 1.27 | 1.28 | 5.3 | 10.0 | 29 | 1091 | 5 | 14 | 5455 | 15099 | Comparative Example |
| c1 | 1.20 | 1.22 | 8.5 | 7.1 | 33 | 893 | 15 | 29 | 13429 | 25708 | Comparative Example |
| d1 | 1.19 | 1.21 | 12.9 | 10.1 | 49 | 1058 | 8 | 23 | 6539 | 24749 | Comparative Example |
| e1 | 0.91 | 0.93 | 5.4 | 11.7 | 39 | 722 | 14 | 25 | 10108 | 17849 | Comparative Example |
| f1 | 1.18 | 1.20 | 13.5 | 3.5 | 80 | 1079 | 13 | 9 | 13763 | 9192 | Comparative Example |
| g1 | 0.90 | 0.92 | 5.1 | 9.6 | 43 | 688 | 20 | 25 | 13768 | 17210 | Comparative Example |

Hereinbefore, the preferred examples of the present invention have been described, but the present invention is not limited to the examples. Addition, omission, substitution, and other modifications of configuration may be made within a range not departing from the essence of the present invention. The present invention is not limited by the above-described description, and is limited only by the attached claims.

INDUSTRIAL APPLICABILITY

With regard to TRIP steel, a high-strength cold-rolled steel sheet that is excellent in ductility and hole expansibility, and a production method thereof are provided.

The invention claimed is:
1. A cold-rolled steel sheet comprising a steel sheet chemical composition including, by mass %,
C: 0.02% to 0.4%,
Si: 0.001% to 2.5%,
Mn: 0.001% to 4.0%,
Al: 0.001% to 2.0%,
P: limited to 0.15% or less,
S: limited to 0.03% or less,
N: limited to 0.01% or less,
O: limited to 0.01% or less,
optionally one or more selected from
Ti: 0.2% or less,
Nb: 0.2% or less,
B: 0.005% or less,
Mg: 0.01% or less,
REM: 0.1% or less,
Ca: 0.01% or less,
Mo: 1.0% or less,
Cr: 2.0% or less,
V: 1.0% or less,
W: 1.0% or less,
Ni: 2.0% or less,
Cu: 2.0% or less,
Co: 1.0% or less,
Sn: 0.2% or less,
Zr: 0.2% or less, and
As: 0.5% or less, and
a balance including Fe and unavoidable impurities,
wherein a sum of the Si content and the Al content is 1.0% to 4.5% in the chemical composition of the steel sheet,
an average pole density of an orientation group from {100}<011> to {223}<110>, which is a pole density expressed by an arithmetic average of pole densities of respective crystal orientations {100}<011>, {116}<110>, {114}<110>, {112}<110>, and {223}<110>, is 1.0 to 6.5, and a pole density of a crystal orientation {332}<113> is 1.0 to 5.0 in a sheet thickness central portion within a range of ⅝ to ⅜ of a sheet thickness,
a microstructure of the steel sheet includes a plurality of grains,
the microstructure of the steel sheet includes, by an area ratio, 5% to 80% of ferrite, 5% to 80% of bainite, and 2% to 30% of retained austenite, in the microstructure, martensite is limited to 20% or less, pearlite is limited to 10% or less, and tempered martensite is limited to 60% or less, and
rC that is a Lankford value in a direction orthogonal to a rolling direction is 0.70 to 1.10, and r30 that is a Lankford value in a direction forming an angle of 30° with the rolling direction is 0.70 to 1.10.
2. The cold-rolled steel sheet according to claim 1, wherein the steel sheet chemical composition further includes, by mass %, one or more selected from the group consisting of
Ti: 0.001% to 0.2%,
Nb: 0.005% to 0.2%,
B: 0.0001% to 0.005%,
Mg: 0.0001% to 0.01%,
REM: 0.0001% to 0.1%,
Ca: 0.0001% to 0.01%,
Mo: 0.001% to 1.0%,
Cr: 0.001% to 2.0%,
V: 0.001% to 1.0%,
W: 0.001% to 1.0%,
Ni: 0.001% to 2.0%,
Cu: 0.001% to 2.0%,
Co: 0.0001% to 1.0%,
Sn: 0.0001% to 0.2%,
Zr: 0.0001% to 0.2%, and
As: 0.0001% to 0.5%.
3. The cold-rolled steel sheet according to claim 1 or 2, wherein a volume average diameter of the grains is 2 μm to 15 μm.

4. The cold-rolled steel sheet according to claim 1 or 2, wherein the average pole density of the orientation group from {100}<011> to {223}<110> is 1.0 to 5.0, and the pole density of the crystal orientation {332}<113> is 1.0 to 4.0.

5. The cold-rolled steel sheet according to claim 1 or 2, wherein among the plurality of grains, an area ratio of grains which exceed 35 μm is limited to 10% or less.

6. The cold-rolled steel sheet according to claim 1 or 2, wherein among the plurality of grains, a proportion of grains, in which a value obtained by dividing a length of a grain in the rolling direction by a length of a grain in a sheet thickness direction is 3.0 or less, is 50% to 100%.

7. The cold-rolled steel sheet according to claim 1 or 2, wherein a Vickers hardness of the bainite is 180 HV or more, and an average concentration of C in the retained austenite is 0.9% or more.

8. The cold-rolled steel sheet according to claim 1 or 2, wherein the rL that is the Lankford value in the rolling direction is 0.70 to 1.10, and r60 that is a Lankford value in a direction forming an angle of 60° with the rolling direction is 0.70 to 1.10.

9. The cold-rolled steel sheet according to claim 1 or 2, wherein a hot-dip galvanized layer or a galvannealed layer is provided on a surface of the steel sheet.

10. A production method of a cold-rolled steel sheet, the production method comprising:
a first hot-rolling process of performing a hot-rolling with respect to a steel having a steel chemical composition, so as to set an average austenite grain size of the steel to 200 μm or less, wherein the first hot-rolling process includes at least one pass of rolling reduction with a rolling reduction ratio of 40% or more in a temperature range of 1,000° C. to 1,200° C., and
the steel chemical composition including, by mass %,
C: 0.02% to 0.4%,
Si: 0.001% to 2.5%
Mn: 0.001% to 4.0%,
Al: 0.001% to 2.0%,
P: limited to 0.15% or less,
S: limited to 0.03% or less,
N: limited to 0.01% or less,
O: limited to 0.01% or less,
optionally one or more selected from
Ti: 0.2% or less,
Nb: 0.2% or less,
B: 0.005% or less,
Mg: 0.01% or less,
REM: 0.1% or less,
Ca: 0.01% or less,
Mo: 1.0% or less,
Cr: 2.0% or less,
V: 1.0% or less,
W: 1.0% or less,
Ni: 2.0% or less,
Cu: 2.0% or less,
Co: 1.0% or less,
Sn: 0.2% or less,
Zr: 0.2% or less, and
As: 0.5% or less, and
a balance including Fe and unavoidable impurities, and wherein a sum of the Si content and the Al content is 1.0% to 4.5%;
a second hot-rolling process of performing a hot-rolling with respect to the steel, wherein the hot-rolling process includes a large-rolling-reduction pass with a rolling reduction ratio of 30% or more in a temperature range of $T1+30°$ C. to $T1+200°$ C. when a temperature calculated by a following Expression 1 is set to $T1°$ C., an accumulative rolling reduction ratio in the temperature range of $T1+30°$ C. to $T1+200°$ C. is 50% or more, an accumulative rolling reduction ratio in a temperature range that is higher than or equal to $Ar_3°$ C. calculated by a following Expression 4 and lower than $T1+30°$ C. is limited to 30% or less, and a rolling termination temperature is $Ar_3°$ C. calculated by the following Expression 4 or higher;
a first cooling process of performing a cooling with respect to the steel, such that a standby time t second, which is set as a time from a completion of a final pass among the large-rolling-reduction passes to a cooling initiation, satisfies a following Expression 2;
a coiling process of performing a coiling with respect to the steel in a temperature range of 650° C. or lower;
a pickling process of performing a pickling with respect to the steel;
a cold-rolling process of performing a cold-rolling with respect to the steel at a rolling reduction ratio of 30% to 90%;
a two-step heating process of performing a two-step heating with respect to the steel, in which an average heating rate HR1 in a temperature range from room temperature to 650° C. is 0.3° C./s or more, and an average heating rate HR2 in a temperature range from higher than 650° C. to $Ac_1°$ C., when $Ac_1$ is calculated by a following Expression 5, is 0.5×HR1 or less, in units of ° C./s;
a retaining process of performing a retaining with respect to the steel within a temperature range of $Ac_1°$ C. to 900° C. for 1 second to 300 seconds;
a cooling process of performing a cooling with respect to the steel until a temperature range of 580° C. to 780° C. at an average cooling rate of 1° C./s to 20° C./s;
a cooling process of performing a cooling with respect to the steel to a temperature $T_{OA}$, which is within a temperature range of 350° C. to 500° C., at an average cooling rate of 5° C./s to 200° C./s; and either
(a) a retaining process of performing a retaining with respect to the steel so as to obtain a steel sheet, wherein the steel is retained within the temperature range of 350° C. to 500° C. for a time of $t_{OA}$ seconds or more, which is calculated by a following Expression 6, to 1000 seconds or less, or
(b) a cooling and retaining process of performing a cooling and retaining with respect to the steel so as to obtain a steel sheet, wherein the steel is further cooled to a temperature of 350° C. or lower, then the steel is reheated to the temperature range of 350° C. to 500° C., and the steel is retained within the temperature range of 350° C. to 500° C. for the time of $t_{OA}$ seconds or more, which is calculated by the following Expression 6, to 1000 seconds or less, $$T1=850+10\times([C]+[N])\times[Mn]+350\times[Nb]+250\times[Ti]+40\times[B]+10\times[Cr]+100\times[Mo]+100\times[V] \quad \text{(Expression 1)}$$

here, [C], [N], [Mn], [Nb], [Ti], [B], [Cr], [Mo], and [V] represent mass percentages of C, N, Mn, Nb, Ti, B, Cr, Mo, and V, respectively, $$t \leq 2.5 \times t1 \quad \text{(Expression 2)}$$

here, t1 is expressed by a following Expression 3, $$t1=0.001\times((Tf-T1)\times P1/100)^2-0.109\times((Tf-T1)\times P1/100)+3.1 \quad \text{(Expression 3)}$$

here, Tf represents a Celsius temperature of the steel at the time of the completion of the final pass, and P1 represents a percentage of the rolling reduction ratio during the final pass, $$Ar_3 = 879.4 - 516.1 \times [C] - 65.7 \times [Mn] + 38.0 \times [Si] + 274.7 \times [P] \quad \text{(Expression 4)}$$

$$Ac_1 = 723 - 10.7 \times [Mn] - 16.9 \times [Ni] + 29.1 \times [Si] + 16.9 \times [Cr] + 290 \times [As] + 6.38 \times [W] \quad \text{(Expression 5)}$$

$$t_{OA} = 10^{0.0002(T_{OA} - 425)^2 + 1.18} \quad \text{(Expression 6)}.$$

11. The production method of a cold-rolled steel sheet according to claim 10, wherein the steel chemical composition further includes, by mass %, one or more selected from
Ti: 0.001% to 0.2%,
Nb: 0.005% to 0.2%,
B: 0.0001% to 0.005%,
Mg: 0.0001% to 0.01%,
REM: 0.0001% to 0.1%,
Ca: 0.0001% to 0.01%,
Mo: 0.001% to 1.0%,
Cr: 0.001% to 2.0%,
V: 0.001% to 1.0%,
W: 0.001% to 1.0%,
Ni: 0.001% to 2.0%,
Cu: 0.001% to 2.0%,
Co: 0.0001% to 1.0%,
Sn: 0.0001% to 0.2%,
Zr: 0.0001% to 0.2%, and
As: 0.0001% to 0.5%.

12. The production method of a cold-rolled steel sheet according to claim 10 or 11,
wherein the standby time t second satisfies a following Expression 8 using t1

$$0 \leq t < t1 \quad \text{(Expression 8)}.$$

13. The production method of a cold-rolled steel sheet according to claim 10 or 11,
wherein the standby time t second satisfies the satisfies a following Expression 9 using t1

$$t1 \leq t \leq 2.5 \times t1 \quad \text{(Expression 9)}.$$

14. The production method of a cold-rolled steel sheet according to claim 10 or 11,
wherein a cooling temperature variation that is a difference between a steel temperature at the time of the cooling initiation and a steel temperature at the time of the cooling termination is 40° C. to 140° C., in the first cooling, and the steel temperature at the time of the cooling termination is T1+100° C. or lower.

15. The production method of a cold-rolled steel sheet according to claim 10 or 11,
wherein the first hot-rolling includes a pass having a rolling reduction ratio of 40% or more at least two or more times, so as to control an average austenite grain size of the steel to be 100 μm or less.

16. The production method of a cold-rolled steel sheet according to claim 10 or 11,
wherein the second cooling is initiated within 10 seconds after the steel is passed through a final rolling stand and after terminating the first cooling.

17. The production method of a cold-rolled steel sheet according to claim 10 or 11,
wherein a temperature rising of the steel between respective passes in the temperature range of T1+30° C. to T1+200° C. is set to 18° C. or lower in the second hot-rolling.

18. The production method of a cold-rolled steel sheet according to claim 10 or 11,
wherein the first cooling is performed at between rolling stands.

19. The production method of a cold-rolled steel sheet according to claim 10 or 11,
wherein a hot-dip galvanized layer or a galvannealed layer is formed on a surface of the steel sheet.

* * * * *